(12) United States Patent
Arai et al.

(10) Patent No.: US 11,460,731 B2
(45) Date of Patent: Oct. 4, 2022

(54) LENS, LIGHT SOURCE UNIT, BACKLIGHT APPARATUS, AND DISPLAY APPARATUS

(71) Applicant: Saturn Licensing LLC, New York, NY (US)

(72) Inventors: Takeo Arai, Saitama (JP); Junji Morimoto, Saitama (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 15/652,590

(22) Filed: Jul. 18, 2017

(65) Prior Publication Data

US 2018/0011375 A1 Jan. 11, 2018

Related U.S. Application Data

(60) Continuation of application No. 14/054,353, filed on Oct. 15, 2013, now abandoned, which is a division of (Continued)

(30) Foreign Application Priority Data

Feb. 15, 2008 (JP) .................................. 2008-034627

(51) Int. Cl.
*G02F 1/13357* (2006.01)
*G02B 5/02* (2006.01)
(Continued)

(52) U.S. Cl.
CPC .......... *G02F 1/133606* (2013.01); *F21V 5/04* (2013.01); *G02B 5/021* (2013.01); *G02B 5/0268* (2013.01); *G02B 5/0278* (2013.01); *G02B 19/0014* (2013.01); *G02B 19/0028* (2013.01); *G02B 19/0066* (2013.01); *F21V 5/043* (2013.01)

(58) Field of Classification Search
CPC ............ G02B 19/0028; G02B 19/0057; G02B 19/0066; F21V 19/0035; F21V 19/0045; F21V 5/043; G02F 2001/133607
See application file for complete search history.

(56) References Cited

U.S. PATENT DOCUMENTS 1,456,585 A * 5/1923 Bell ........................ F21S 41/28
362/335
5,032,960 A 7/1991 Katoh
(Continued)

FOREIGN PATENT DOCUMENTS

JP    11-006904 A    1/1999
JP    2002-049326 A    2/2002
(Continued)

*Primary Examiner* — Colin J Cattanach
(74) *Attorney, Agent, or Firm* — Richard LaPeruta

(57) ABSTRACT

A lens diffusing light emitted from a light source includes a concave light-incident surface, a light guide portion, and a light-emitting surface. The light-incident surface includes a plane portion opposed to the light source and an optical function portion that is formed on the plane portion and one of scatters and diffuses the light. The light emitted from the light source enters the light-incident surface. The light that has entered the light-incident surface passes through the light guide portion. The light-emitting surface emits the light passed through the light guide portion.

37 Claims, 22 Drawing Sheets

Related U.S. Application Data application No. 12/366,066, filed on Feb. 5, 2009, now Pat. No. 8,585,254.

(51) Int. Cl.
  *G02B 19/00* (2006.01)
  *F21V 5/04* (2006.01)

(56) References Cited

U.S. PATENT DOCUMENTS

| | | | |
|---|---|---|---|
| 5,062,027 A | 10/1991 | Machida | |
| 5,515,253 A | 5/1996 | Sjoborn | |
| 6,558,032 B2 | 5/2003 | Kondo et al. | |
| 6,758,582 B1 | 7/2004 | Hsiao et al. | |
| 6,819,506 B1 | 11/2004 | Taylor | |
| 7,048,414 B2 | 5/2006 | Weber | |
| 7,121,691 B2 | 10/2006 | Coushaine et al. | |
| 7,192,161 B1 | 3/2007 | Cleaver | |
| 7,293,908 B2 | 11/2007 | Beeson et al. | |
| 7,334,933 B1 | 2/2008 | Simon | |
| 7,413,325 B2 | 8/2008 | Chen | |
| 7,422,347 B2 | 9/2008 | Miyairi et al. | |
| 7,431,480 B2 | 10/2008 | Godo | |
| 7,452,114 B2 | 11/2008 | Gasquet | |
| 7,458,714 B2 | 12/2008 | Chang | |
| 7,572,036 B2 | 8/2009 | Yoon | |
| 7,670,031 B2 | 3/2010 | Ogawa | |
| 7,731,395 B2 | 6/2010 | Parkyn et al. | |
| 7,784,977 B2 | 8/2010 | Moolman | |
| 7,798,679 B2 | 9/2010 | Kokubo et al. | |
| 8,157,419 B2 | 4/2012 | Hand et al. | |
| 8,272,771 B2 | 9/2012 | Arai | |
| 8,430,538 B2 | 4/2013 | Holder | |
| 8,585,254 B2 | 11/2013 | Arai et al. | |
| 2002/0097578 A1 | 7/2002 | Greiner | |
| 2002/0180351 A1 | 12/2002 | McNulty | |
| 2003/0067264 A1* | 4/2003 | Takekuma | H01L 33/507 313/501 |
| 2004/0070855 A1* | 4/2004 | Benitez | G02B 3/02 359/858 |
| 2004/0201987 A1* | 10/2004 | Omata | H01L 33/486 362/230 |
| 2005/0093430 A1 | 5/2005 | Ibbetson et al. | |
| 2005/0122742 A1 | 6/2005 | Ho | |
| 2005/0201109 A1* | 9/2005 | Shimura | F21V 5/007 362/382 |
| 2005/0225862 A1 | 10/2005 | Tang | |
| 2005/0254254 A1* | 11/2005 | Moseler | C03B 11/08 362/520 |
| 2006/0203302 A1 | 5/2006 | Tanaka | |
| 2006/0133106 A1 | 6/2006 | Yen | |
| 2006/0186431 A1 | 8/2006 | Miki | |
| 2006/0285311 A1 | 12/2006 | Chang et al. | |
| 2007/0070616 A1* | 3/2007 | Segawa | G02F 1/133606 362/97.1 |
| 2007/0086179 A1 | 4/2007 | Chen | |
| 2007/0091598 A1 | 4/2007 | Chen | |
| 2007/0091615 A1 | 4/2007 | Hsieh | |
| 2007/0133204 A1 | 6/2007 | Huise | |
| 2007/0147073 A1 | 6/2007 | Sakai | |
| 2007/0258247 A1* | 11/2007 | Park | G02B 5/0231 362/326 |
| 2008/0088770 A1 | 4/2008 | Hwang et al. | |
| 2008/0094852 A1 | 4/2008 | King | |
| 2008/0100773 A1 | 5/2008 | Hwang et al. | |
| 2008/0137335 A1* | 6/2008 | Tsai | G02B 5/0247 362/247 |
| 2008/0279541 A1 | 11/2008 | Montgomery et al. | |
| 2009/0109687 A1* | 4/2009 | Householder | F21L 4/027 362/309 |
| 2009/0146158 A1* | 6/2009 | Park | G02B 5/1876 257/89 |
| 2009/0207586 A1 | 8/2009 | Arai et al. | |
| 2010/0172135 A1 | 7/2010 | Holder | |
| 2013/0010494 A1 | 1/2013 | Arai | |

FOREIGN PATENT DOCUMENTS

| | | |
|---|---|---|
| JP | 2002-250807 A | 9/2002 |
| JP | 2005-044661 A | 2/2005 |
| JP | 2006-024615 A | 1/2006 |
| JP | 2006-286608 A | 10/2006 |
| JP | 2007-102139 A | 4/2007 |
| JP | 2007-310419 A | 11/2007 |
| JP | 2008-524636 A | 7/2008 |

\* cited by examiner

LENS, LIGHT SOURCE UNIT, BACKLIGHT APPARATUS, AND DISPLAY APPARATUS

CROSS REFERENCES TO RELATED APPLICATIONS

This application is a continuation of U.S. application Ser. No. 14/054,353, filed on Oct. 15, 2013, which is a divisional application of U.S. patent application Ser. No. 12/366,066 filed Feb. 5, 2009 and entitled "Lens, Light Source Unit, Backlight Apparatus, and Display Apparatus," which contains subject matter related to Japanese Patent Application JP 2008-034627 filed in the Japanese Patent. Office on Feb. 15, 2008. The entire contents of both of the above applications are incorporated herein by reference.

BACKGROUND OF THE INVENTION

1. Field of the Invention

The present invention relates to a backlight apparatus used in, for example, a display apparatus, a lens used in the backlight apparatus, a light source unit, and a display apparatus equipped with the backlight apparatus.

2. Description of the Related Art

Currently, use of LEDs (Light Emitting Diodes) independent for each of R (red), G (green), and B (blue) has contributed to achieving an NTSC (National Television System Committee) ratio of 100% or more in backlights of a high color range used for liquid crystal panels. Therefore, commodification of the backlights in PCs (Personal Computers), amusement equipment, in-car equipment, and TVs is expected.

In a case of a middle- or large-sized backlight of 10 inches or more, for example, sufficient luminance and thinness are required to be compatible therein. Therefore, a new design of a direct LED backlight that has been employed in the middle- or large-sized backlights is required. The direct LED backlight refers to a backlight of a type in which a plurality of LEDs as a light source are arranged two-dimensionally and in parallel to a plane of the liquid crystal panel.

In the case of the direct LED backlight, the number of LEDs to be mounted varies depending on which of a power-type LED and a normal-type LED is used in relation to a light amount. When using the power-type LEDs, it is difficult to dispose the LED elements independent for each of R, G, and B close to each other due to the problem of the number, size, and heat of the LEDs. In other words, an increase in distances among the LED elements results in a disadvantage in mixing red light, green light, and blue light in a limited space. Also in this case, although not many problems are caused when a sufficient optical distance (thickness) can be secured, because it is currently difficult to bring the LED elements close to each other due to the move towards reductions in thickness, color variability is caused.

For reducing the thickness of the liquid crystal panel, side-emitting-type power LEDs of the related art are used in some cases. However, this case also has a limit in terms of color variability.

Meanwhile, when normal low-power LEDs are used, distances among RGB elements can be shortened. However, by merely using the LED elements as they are even when the distances are shortened, generation of color variability right above the LEDs cannot be avoided in a backlight assuming thickness reduction. Moreover, a large variation in RGB light distribution characteristics of the respective LED elements facilitates color variability, which is a large problem.

For solving the problem on such color variability, there is disclosed, for example, a device including a plurality of point light sources arranged one-dimensionally and a cylindrical lens disposed above the plurality of point light sources and elongated in the one dimensional direction (see, for example, Japanese Patent Application Laid-open No. 2006-286608 (paragraphs [0007] and [0009], FIG. 5); hereinafter, referred to as Patent Document 1). The cylindrical lens used in this device includes a concave lens function (52) in a direction vertical to a substrate holding the point light sources (y direction). Further, the cylindrical lens includes a convex lens function (54) in a part of the horizontal direction (x direction). With such a structure, light from the point light sources expands in a planar state even without a light guide plate, whereby color variability is prevented.

SUMMARY OF THE INVENTION

In the cylindrical lens disclosed in Patent Document 1 above, light from the point light sources is diffused by the concave lens function (52). However, the cylindrical lens needs to be devised further for realizing a reduction in thickness of the display panel and suppressing luminance variability or color variability.

In view of the circumstances as described above, there is a need for a lens, a light source unit, a backlight apparatus, and a display apparatus that are capable of efficiently mixing light from a light source and suppressing luminance variability or color variability.

According to an embodiment of the present invention, there is provided a lens diffusing light emitted from a light source, including a concave light-incident surface, a light guide portion, and a light-emitting surface. The concave light-incident surface includes a plane portion opposed to the light source and an optical function portion that is formed on the plane portion and one of scatters and diffuses the light. The light emitted from the light source enters the light-incident surface. The light that has entered the light-incident surface passes through the light guide portion. The light-emitting surface emits the light that has passed through the light guide portion.

When the lens according to the embodiment of the present invention is not provided, for example, luminance of light that enters a generally-used light guide plate or an optical sheet such as a diffusing sheet from the light source becomes partially high at a position right above the light source. In other words, luminance variability or color variability is caused. In the embodiment of the present invention, by the optical function portion formed on the plane portion on the light-incident surface, light that has entered the plane portion is scattered or diffused. Therefore, luminance variability or color variability can be suppressed. Moreover, provision of the optical function portion on the plane portion makes processing and process of the lens for the scattering and diffusion easier at a time of production of the lens.

The light source is provided either singly or plurally. As the light source, an element that emits light by an EL (Electro Luminescence) phenomenon, a cathode tube, or any other light-emitting element is used. The element that emits light by an EL phenomenon is an LED as a dispersion-type EL element or an LED as a genuine EL element.

A single light source includes one or a plurality of light-emitting elements. When a single light source includes one light-emitting element, the light emitted by that light-emitting element may be in any color. When a single light source includes a plurality of light-emitting elements, the light emitted from the light-emitting elements may be monochromatic or may be in a plurality of colors (combination of colors may be changed as appropriate). When the light-emitting element is an LED, for example, a plurality of LEDs are realized in a single package in some cases. In this case, a single light source may correspond to one or a plurality of packages.

In the embodiment of the present invention, when a single light source emits monochromatic light, luminance variability is suppressed, and when a single light source emits light of two colors or more, luminance variability and color variability are suppressed. Hereinafter, at least one of the luminance variability and color variability will be simply referred to as light variability.

Reflectance (or absorptance) of light increases as a degree of "scatter" of light by the optical function portion increases, that is, as light beams advancing in the vertical direction toward the plane portion become less due to the scatter.

For example, the light source is constituted of a plurality of light-emitting elements that are arranged in a predetermined direction and emit light by an EL phenomenon, and the lens is elongated in the predetermined direction. In this case, the lens may have light distribution characteristics that are substantially the same in a direction orthogonal to the predetermined direction within a plane on which the plurality of light-emitting elements are arranged.

The optical function portion is a part that has been subjected to print processing or roughening processing. Accordingly, light is scattered or diffused. Moreover, it becomes possible to adjust an amount of light that passes through the plane portion by the print processing.

The "roughening processing" includes processing of forming the plane portion into a prism-like surface, dot processing, blast processing, and the like.

The "print processing" operates to scatter the light at a micro level. Thus, a part that has been subjected to the "print processing" may be included in a concept of the part that has been subjected to the "roughening processing".

The light-emitting surface includes a part opposed to the plane portion, that has been subjected to the print processing. Because the print processing is performed on both the plane portion and a surface opposed to the plane portion, an effect of scattering the light is promoted and light variability is suppressed. Alternatively, the light-emitting surface includes a part opposed to the plane portion, that has been subjected to the roughening processing.

The light-emitting surface is, for example, one of a cylindrical surface and a toroidal surface.

The lens may further include a bottom surface and one of a print processing portion and a roughening processing portion formed on the bottom surface. Alternatively, a reflective member, a reflective film, or the like only needs to be formed on the bottom surface of the lens. Accordingly, light beams can be increased at the light guide portion, to thus realize high luminance. The term "reflect" refers to not only the case where light is reflected 100%, but also a case where part of the light is transmitted through the bottom surface.

The light guide portion may contain a diffusing material. Accordingly, light from the light source can be efficiently diffused.

The lens further includes a heat flow path that is formed from the light-incident surface to the light-emitting surface and discharges heat radiated from the light source. Accordingly, heat radiated from the light source can be discharged to outside the lens.

The heat flow path may be provided from the plane portion to the light-emitting surface, or from a part other than the plane portion to the light-emitting surface.

The heat flow path may be a through-hole formed in the lens, or may be constituted of a material having higher heat conductivity than a principle material of the lens.

According to another embodiment of the present invention, there is provided a light source unit including a light source and a lens to diffuse light emitted from the light source. It is only necessary that the lens described above be used for the lens.

The light source unit further includes an optical member that is mounted on the light source and one of scatters and diffuses the light. Accordingly, light variability is suppressed. When using the light-emitting element(s) that emits (emit) monochromatic light or light in a plurality of colors as the light source, light distribution characteristics of a specific color can be enhanced. In other words, it becomes possible to orient the light of a specific color from the light source in a desired direction, and cause the light to enter the light-incident surface of the lens.

The optical member includes, for example, a sheet member. A prism sheet, a diffusing sheet, or the like is used as the sheet member. Alternatively, a sheet member whose surface has been subjected to the dot processing or the blast processing may be used.

The light source includes a light-emitting element to emit light by an EL phenomenon, and the optical member includes a sealing member to seal up the light-emitting element. Because the sealing member also functions to scatter or diffuse the light from the light source, light variability can be suppressed, the structure of which also contributes to the reduction in thickness of the light source.

The sealing member may contain a diffusing material.

The light source unit further includes a common substrate, the light-emitting element of the light source is provided plurally, the plurality of light-emitting elements being arranged on the common substrate, and the sealing member seals up each of the plurality of light-emitting elements. In other words, the light source unit includes a so-called potting-type light source block.

A backlight apparatus according to an embodiment of the present invention includes a light source unit and a supporting member to support the light source unit.

A display apparatus according to an embodiment of the present invention includes the backlight apparatus and a light transmission control panel that includes a plurality of pixels and controls transmission of the light emitted from the backlight apparatus for each of the plurality of pixels. A typical example of the light transmission control panel is a liquid crystal panel. However, the light transmission control panel may be any panel as long as it can control the light transmission of the backlight for each pixel.

As described above, according to the embodiments of the present invention, light from the light source can be efficiently mixed, and luminance variability or color variability can be suppressed.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

Figure 1:
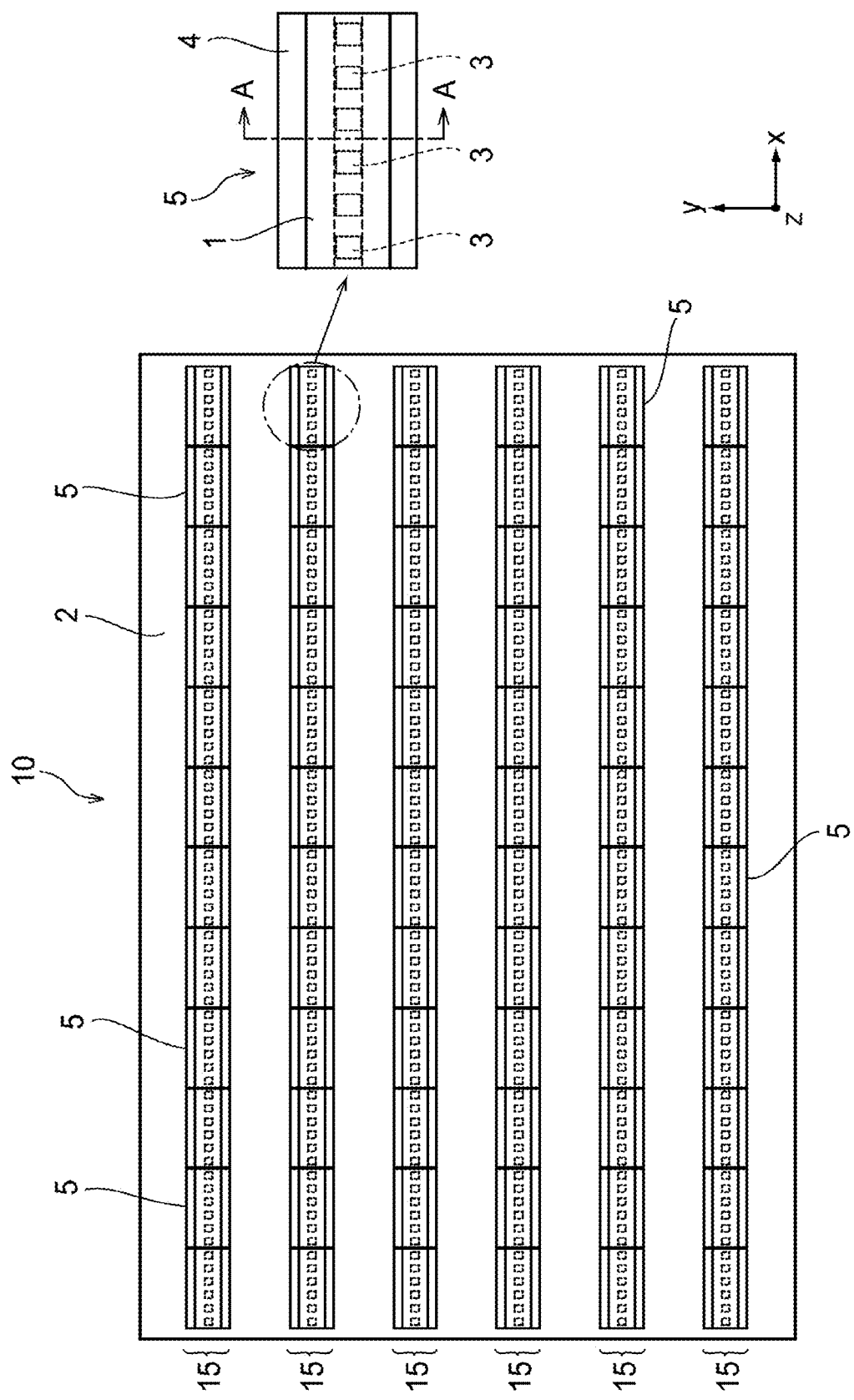
FIG. 1 is a diagram showing a backlight apparatus according to an embodiment of the present invention.

FIG. 1 is a diagram showing a backlight apparatus according to an embodiment of the present invention.

A backlight apparatus 10 includes a plurality of light source units 5 and a supporting member 2 for supporting the light source units 5. The backlight apparatus 10 is applied to a display apparatus that uses a light transmission control panel (not shown). A typical example of the light transmission control panel is a liquid crystal panel, though any panel may be used as long as it can variably control light transmission of a backlight for each pixel.

When the backlight apparatus 10 is applied to the display apparatus, an optical sheet (not shown) such as a diffusing sheet and a prism sheet is interposed between the backlight apparatus 10 and the light transmission control panel in some cases.

The supporting member 2 may be of a substrate type or a frame type, or alternatively be an assembly as a combination of two or more members. The supporting member 2 is formed of a resin, metal, or the like, but is not limited thereto. A material having high heat conductivity such as copper, aluminum, and carbon may be used as the material for the supporting member 2, for diffusing heat radiated from the light source units 5.

The plurality of light source units 5 are arranged in one direction, that is, laterally (x-axis direction) in FIG. 1, for example, to thus constitute a single row of linear light source 15. By arranging a plurality of linear light sources 15 longitudinally (y-axis direction), the plurality of linear light sources 15 are arranged in a planar state. In the example of FIG. 1, a single row of linear light source 15 includes 12 light source units 5, and a single backlight apparatus 10 includes 6 rows of linear light sources 15. The number, arrangement, size, and the like of the light source units 5 and the linear light sources 15 can be changed as appropriate.

As shown in FIG. 1, a single light source unit 5 includes a plurality of (6 in the example shown in FIG. 1) LED blocks 3 mounted on a base member 4, and a lens 1 for diffusing light from the LED blocks 3. A single LED block 3 is constituted by packaging one or a plurality of LEDs 7. A single LED block 3 includes one or a plurality of LEDs 7 (see FIG. 3). However, a structure in which a single light source unit 5 includes a single LED block 3 is also possible. A pitch of the LED blocks 3 is several mm to several ten mm, but is not limited thereto.

Figure 2:
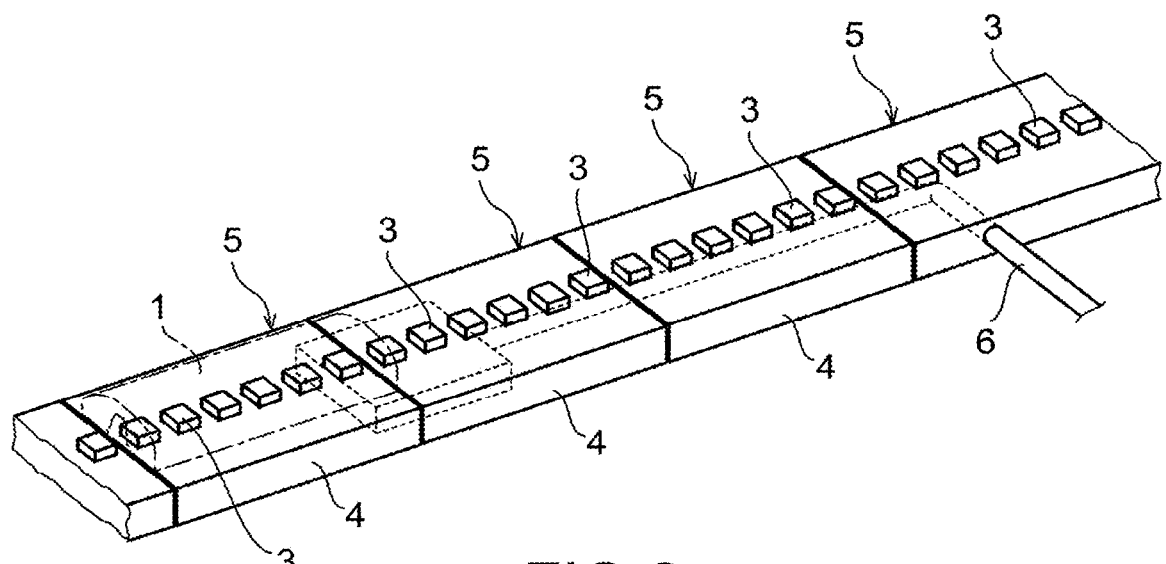
FIG. 2 is a perspective diagram showing a part of a linear light source.

FIG. 2 is a perspective diagram showing a part of the linear light source 15. As shown in the figure, the linear light source 15 is constituted by arranging the plurality of light source units 5. Although no gap is provided between the light source units 5 in the example of FIG. 2, a predetermined gap may be provided between the light source units 5. It should be noted that a power supply lead wire 6 is connected to a back surface of each of the base members 4 of the linear light source 15.

When a single LED block 3 includes one LED 7, light emitted from that LED 7 is monochromatic (white, red, green, blue, or any other color). The LEDs that respectively emit a plurality of colors are arranged sequentially.

Figure 3:
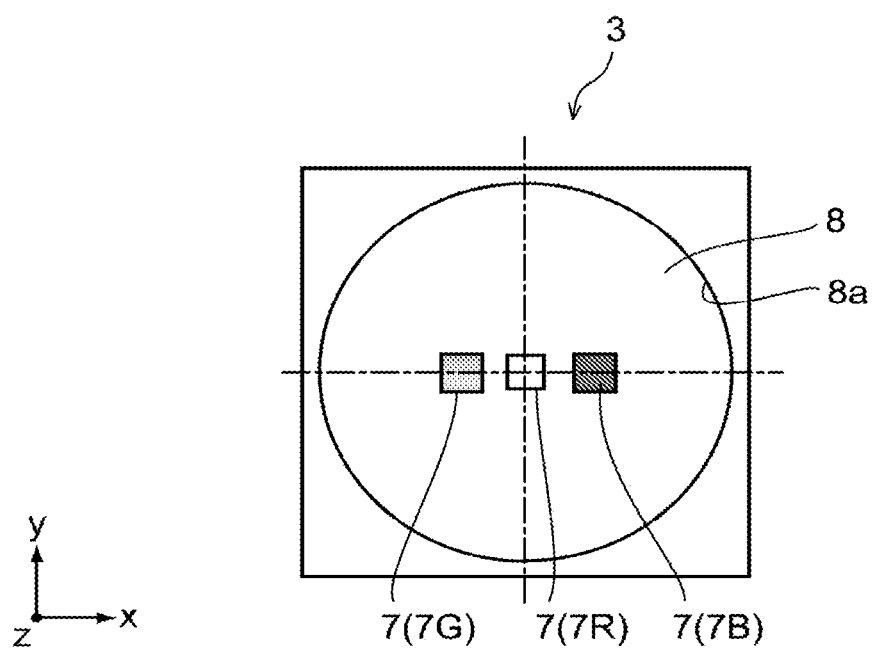
FIG. 3 is a plan view showing an LED block of this embodiment.

FIG. 3 is a plan view showing the LED block 3 of this embodiment. As shown in the figure, each of the LED blocks 3 includes LEDs 7R, 7G, and 7B for three colors of R, G, and B, and members including a substrate for supporting the LEDs 7R, 7G, and 7B, a reflector 8, and the like. The LEDs 7R, 7G, and 7B are arranged in the x-axis direction.

The reflector 8 includes a concave portion 8a, and the LEDs 7 are disposed inside the concave portion 8a. The reflector 8 is formed of a material having high reflectance for specular reflection (i.e., 0-order diffraction), such as aluminum nitride. However, it is also possible for the reflector 8 to be formed of aluminum, copper, iron, or stainless steel, or other materials. Alternatively, a material having high heat conductivity such as a carbon resin or metal other than those described above may be used for the reflector 8. Accordingly, accumulation of heat in the LED blocks 3 can be reduced and a large current can therefore be applied to the LEDs 7.

Figure 4:
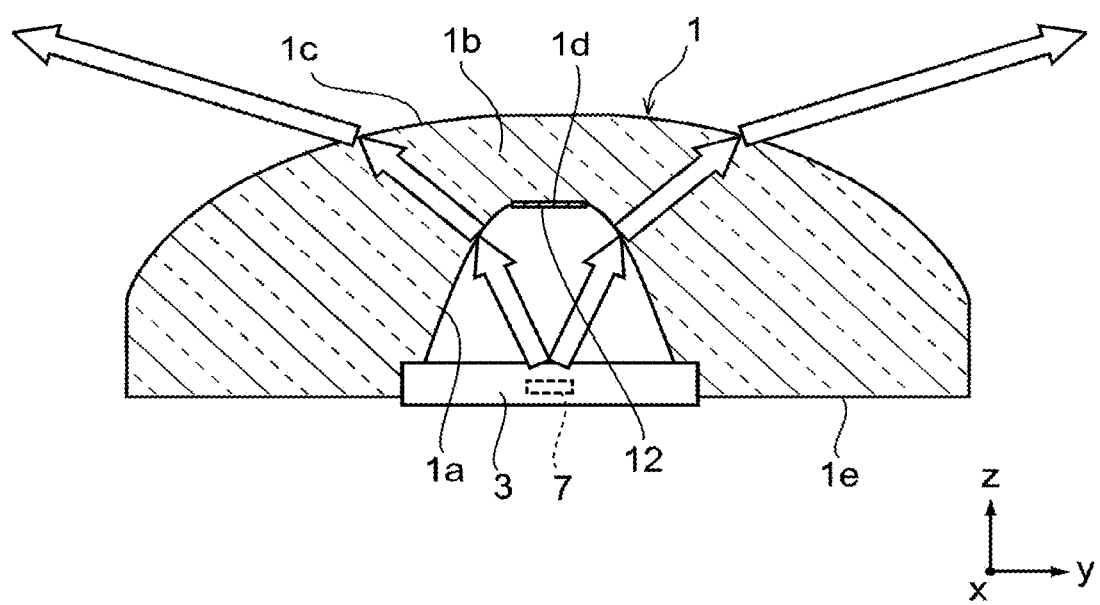
FIG. 4 is a cross-sectional diagram of a single light source unit that is taken along the line A-A of FIG. 1.
Figure 5:
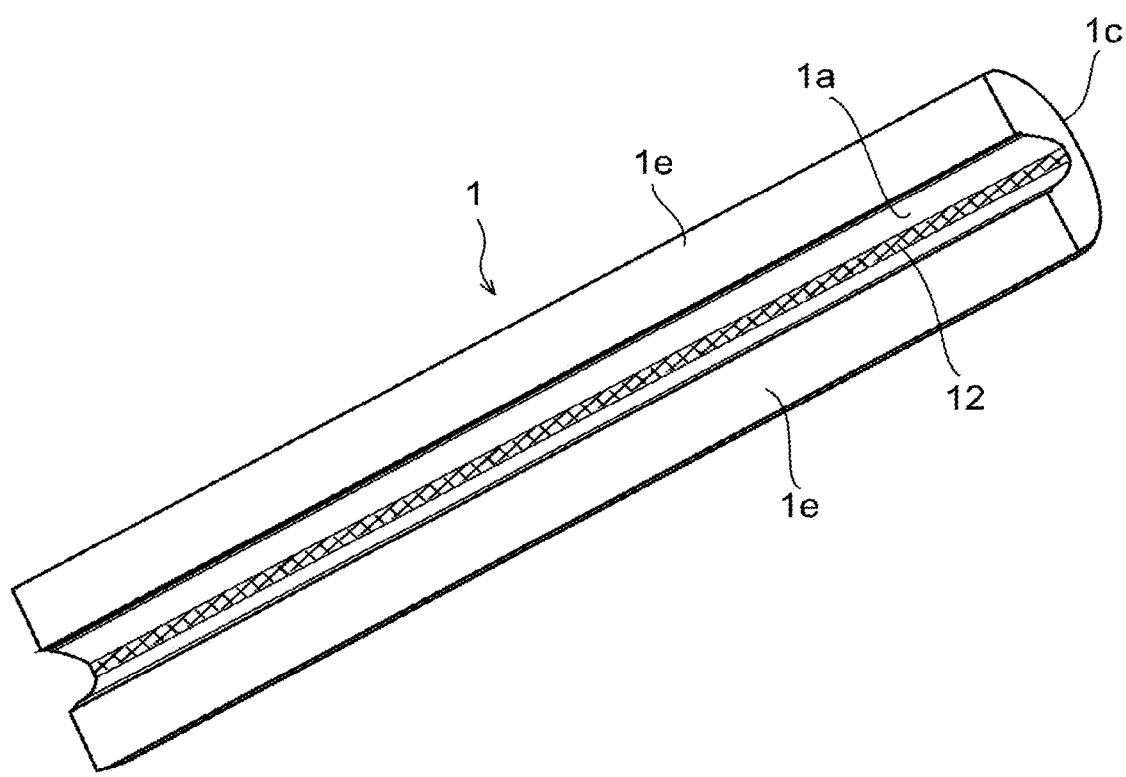
FIG. 5 is a perspective diagram showing a lens seen from a bottom surface thereof.

FIG. 4 is a cross-sectional diagram of a single light source unit 5 that is taken along the line A-A of FIG. 1. FIG. 5 is a perspective diagram showing the lens 1 seen from a bottom surface thereof.

The lens 1 is elongated in a predetermined direction, that is, the x-axis direction, for example, in accordance with the number of LED blocks 3 provided in the single light source unit 5. When the number of LED blocks 3 is one, it is also possible that the lens 1 is elongated in the y-axis direction. A length of the lens 1 in the x-axis direction is about several ten mm, but can be changed as appropriate without being limited thereto. A length of the lens 1 in the y-axis direction is about several mm to several ten mm, but can be changed as appropriate without being limited thereto.

The lens 1 is elongated in the x-axis direction and has light distribution characteristics that are substantially the same in the y-axis direction orthogonal to the x-axis direction within a plane on which the plurality of LEDs 7 are arranged.

For example, the lens 1 includes a concave light-incident surface 1a, a light guide portion 1b through which light that has entered the light-incident surface 1a passes, and a light-emitting surface 1c for emitting the light. The light-incident surface 1a, the light guide portion 1b, and the light-emitting surface 1c each have a shape that is approximately constant in a longitudinal direction of the lens 1. The plurality of LED blocks 3 are arranged along the longitudinal direction of the lens 1 such that the LEDs 7 emit light toward a concave portion formed by the light-incident surface 1a. The light-emitting surface 1c of the lens 1 includes, for example, a cylindrical surface (i.e., partial sphere seen from an x-z plane in FIG. 4). The light-emitting surface 1c may instead be constituted of a toroidal surface, a combination of the cylindrical surface and a plane, a combination of the toroidal surface and the plane, or other aspherical surfaces. In a case of a lens including the toroidal surface, a lens having a radius, a conic coefficient, or an aspherical coefficient set for each chip size of the plurality of LEDs 7 may be used.

The light-incident surface 1a includes a plane portion 1d opposed to the block of the LEDs 7. The plane portion 1d is provided with a part including an optical function of scattering or diffusing light from the LED blocks 3. As shown in FIG. 5, for example, in this embodiment, the plane portion 1d is provided with a print processing portion 12 that has been subjected to print processing. During the print processing, the plane portion 1d is printed in white or a color close to white, for example, which makes it possible to adjust an amount of light that transmits through the plane portion 1d based on a printed state. The color in the print processing is not limited to white or a color close to white, and may be any color as long as it can at least scatter light.

It should be noted that the reflectance (or absorptance) of light increases as a degree of "scatter" of light in the plane portion 1d increases, that is, as light beams advancing in the vertical direction toward the plane portion 1d become less due to the scatter.

Glass, polycarbonate, olefin, or other resins is used as the material for the lens 1.

An operation of the light source unit 5 structured as described above will be described.

Light emitted from the each of the LED blocks 3 enters the light-incident surface 1a. Due to the concaveness of the light-incident surface 1a, the light that has entered the light-incident surface 1a is diffused and passed through the light guide portion 1b as shown in FIG. 4. The light that has passed through the light guide portion 1b is emitted from the light-emitting surface 1c. Due to the convexedness of the light-emitting surface 1c, the light emitted from the light-emitting surface 1c is diffused additionally.

Figure 6:
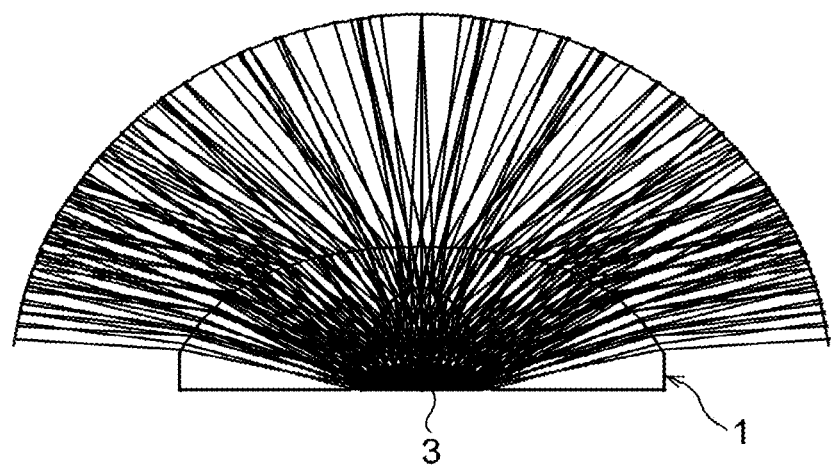
FIG. 6 is a simulation diagram showing a plurality of light beams passing through the lens.
Figure 7:
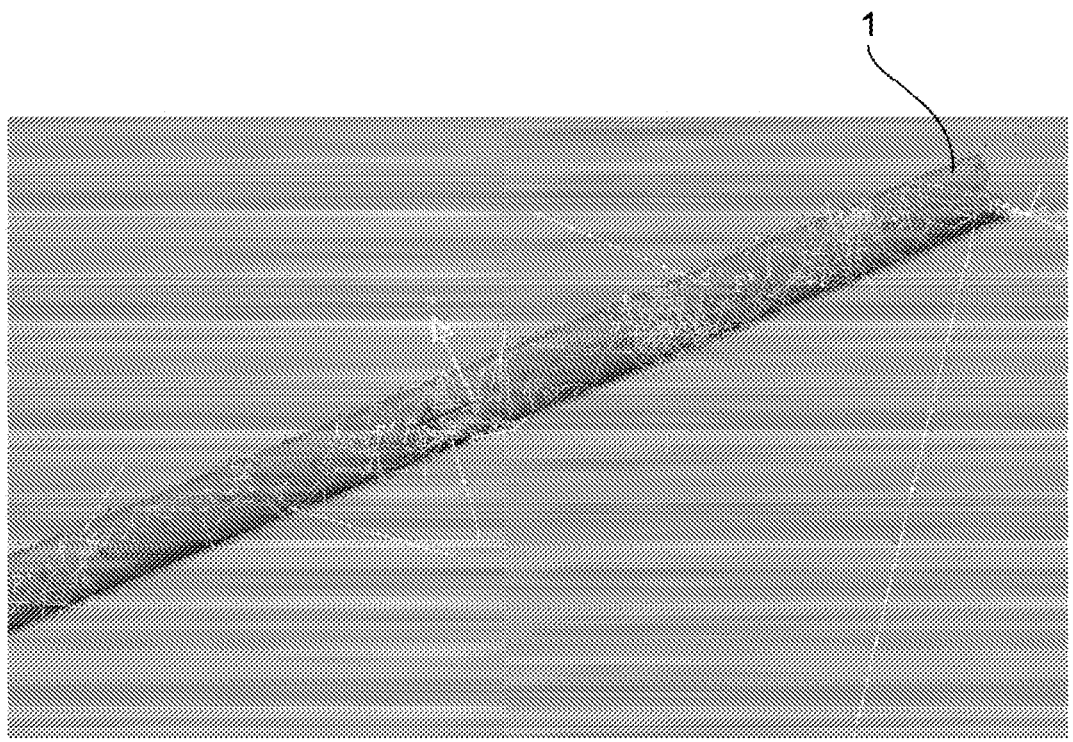
FIG. 7 is a simulation diagram showing the light beams passing through the lens, the lens being seen from a z-axis direction thereof.

FIG. 6 is a simulation diagram showing a plurality of light beams passing through the lens 1. As can be seen from FIG. 6, due to a unique shape of the lens 1, the light emitted from the LED blocks 3 exits the lens 1 diffusely. FIG. 7 is a simulation diagram showing the light beams passing through the lens 1, the lens 1 being seen from the z-axis direction thereof. As can be seen from FIG. 7, in the light guide portion 1b, light also advances in the longitudinal direction of the lens 1 or a direction close to the longitudinal direction. The light reflected by the light-emitting surface 1c out of the light that has passed through the light guide portion 1b advances toward a bottom surface 1e. When a reflective member or a reflective film is formed on the bottom surface 1e as will be described later, for example, the light is reflected by the bottom surface 1e.

Further, in the lens 1 of this embodiment, the light that advances in the vertical direction (z-axis direction) or a near-vertical direction from the LED block 3 is scattered or diffused by the print processing portion 12 formed right above the LED block 3. Accordingly, the colors of light are mixed effectively at a center portion of the light guide portion 1b of the lens 1 (between the plane portion 1d and a part of the light-emitting surface 1c opposed thereto), thus resulting in suppression of luminance variability and color variability.

Figure 8:
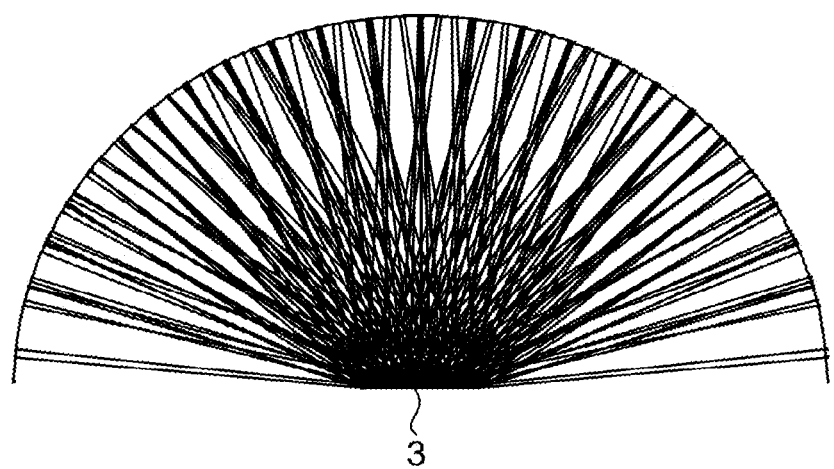
FIG. 8 is a simulation diagram showing light beams from the LED block in a case where no lens of this embodiment is provided.

FIG. 8 is a simulation diagram showing light beams from the LED block 3 in a case where the lens 1 of this embodiment is not provided. It can be seen from the comparison with the case of FIG. 8 that the lens 1 shown in FIG. 6 has less light beams that are emitted in the vertical or near-vertical direction from the light-emitting surface 1c of the lens 1.

Moreover, although the lens 1 is of a small size, by providing a part having a plane surface, print processing to that plane portion 1d becomes easier.

In this embodiment, the LED blocks 3 are arranged linearly in the x-axis direction and the lens 1 is elongated in the x-axis direction. Thus, the number of lenses 1 to be mounted on a single backlight apparatus 10 can be reduced. Therefore, in production of the backlight apparatus 10, the number of processes for mounting the lenses 1 (processes for mounting light source units 5) can be reduced, thus leading to a reduction in costs.

In this embodiment, because there is no need to use an expensive optical member such as a dichroic mirror, it becomes possible to realize an inexpensive backlight apparatus 10 and display apparatus.

For suppressing luminance variability, a diffusing sheet or a sheet for suppressing luminance variability is generally used. In such a case, due to deterioration of a light use efficiency, a large number of LEDs 7 have been provided to thus maintain high luminance as a whole. In this embodiment, however, because there is no need to use such a sheet for suppressing luminance variability, desired luminance can be obtained even when the number of LEDs 7 is reduced.

Figure 9:
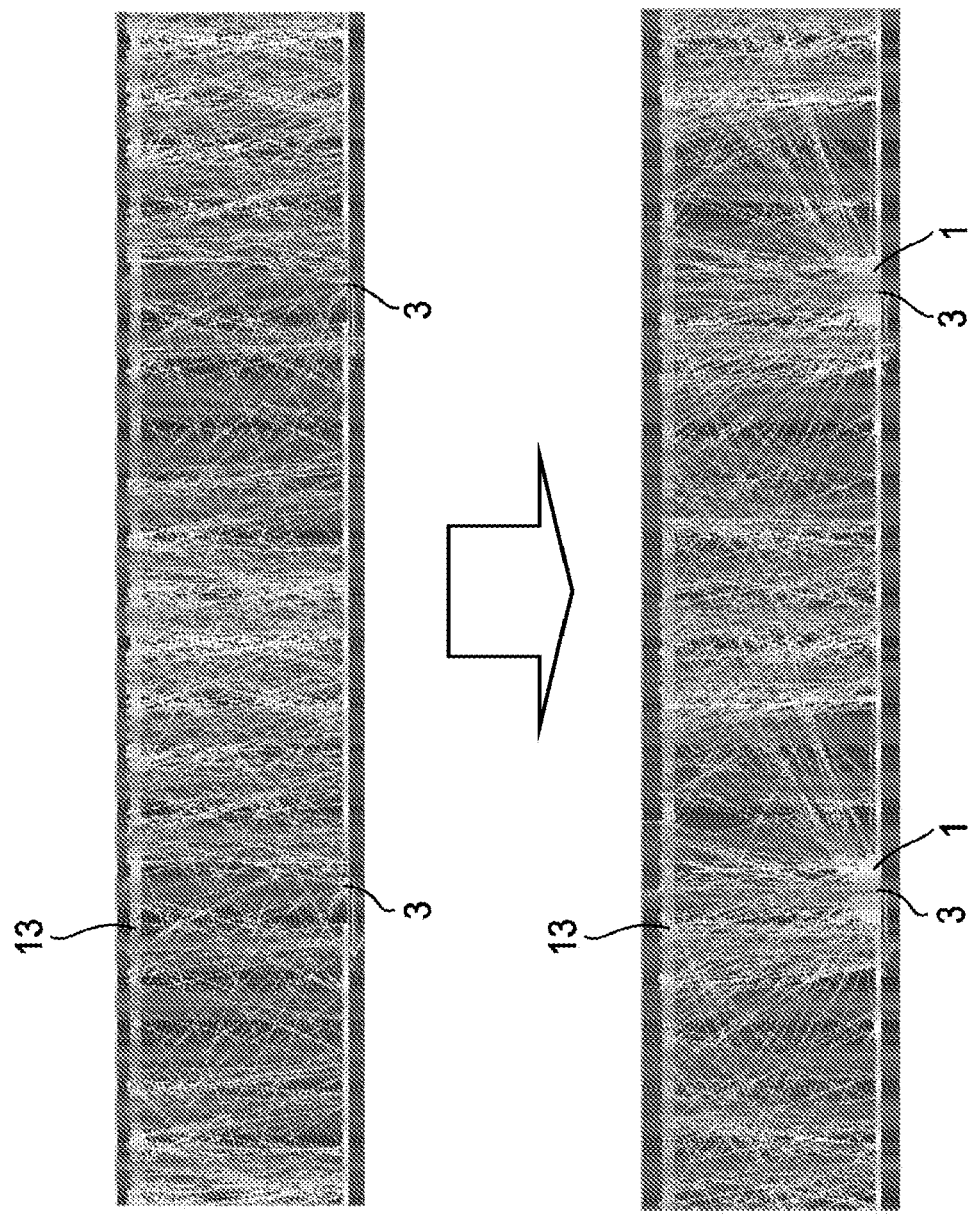
FIG. 9A is a simulation diagram showing light beams from the LED blocks to a diffusing plate in cases where the lens is provided.
FIG. 9B is a simulation diagram showing light beams from the LED blocks to a diffusing plate in cases where the lens is not provided.
Figure 10:
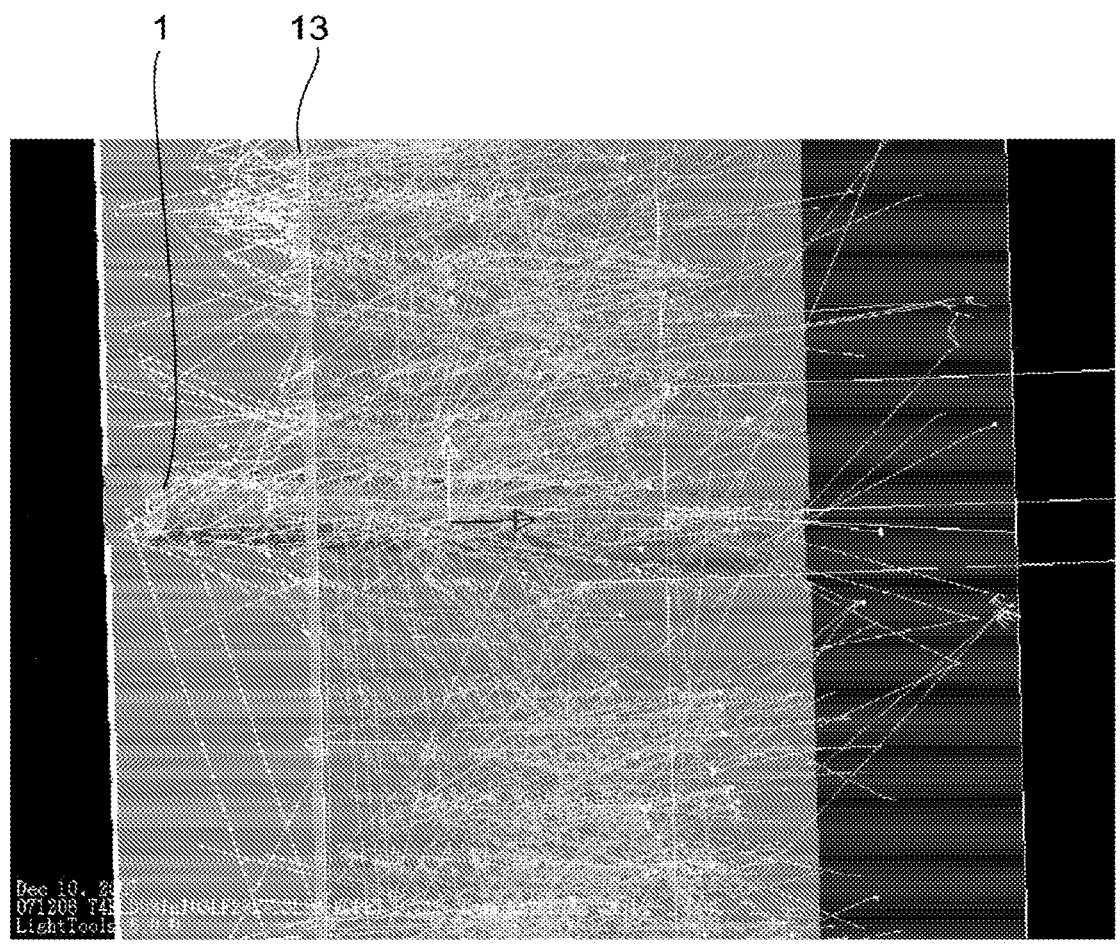
FIG. 10 is a simulation diagram showing light beams in the case where the lens is provided in FIG. 9B, seen from above the diffusing plate.

FIGS. 9A and 9B are simulation diagrams respectively showing light beams from the LED blocks 3 to a diffusing plate 13 in cases where the lens 1 is and is not provided. The figures are diagrams seen from the x-axis direction. FIG. 10 is a simulation diagram showing light beams in the case where the lens 1 is provided in FIG. 9B, seen from above the diffusing plate 13. It can be seen that a larger amount of light beams advance in oblique directions out of the light beams emitted from the lens 1 in FIG. 9B than in FIG. 9A. In other words, the case where the lens 1 is provided has less luminance variability and color variability on the diffusing plate 13 than the case where the lens 1 is not provided.

Figure 11A:
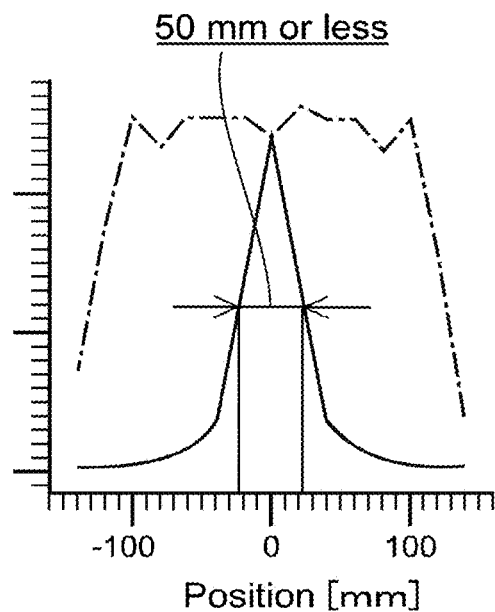
FIG. 11A is a diagram showing TFs (Transfer Functions) on the diffusing plate in the case shown in FIG. 9A.
Figure 11B:
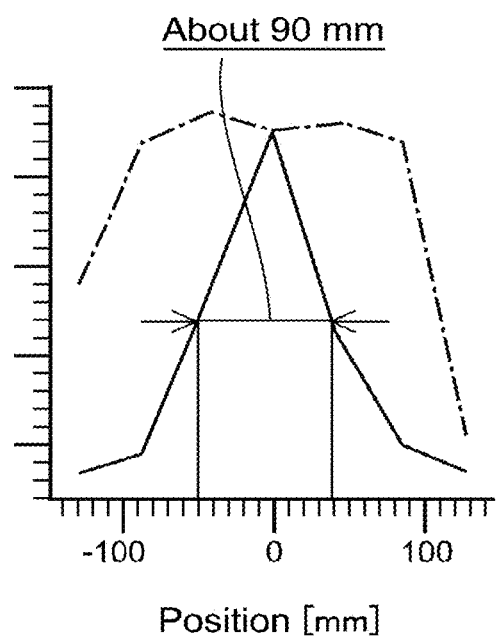
FIG. 11B is a diagram showing TFs (Transfer Functions) on the diffusing plate in the case shown in FIG. 9B.

FIGS. 11A and 11B are diagrams showing TFs (Transfer Functions) of the lens shown in FIGS. 9A and 9B, respectively. In each of FIGS. 11A and 11B, a graph represented by a solid line shows a TF of the lens in the y-axis direction (see FIG. 4). A graph represented by a dashed line shows a TF of the lens in the x-axis direction.

When focusing on the TF in the y-axis direction represented by the solid line in particular, it can be seen that, as shown in FIG. 11A, an FWHM (Full Width at Half Maximum) in the case where the lens 1 is not provided is 50 mm or less. It can also be seen that, as shown in FIG. 11B, the FWHM is about 90 mm in the case where the lens 1 is provided.

Figure 12:
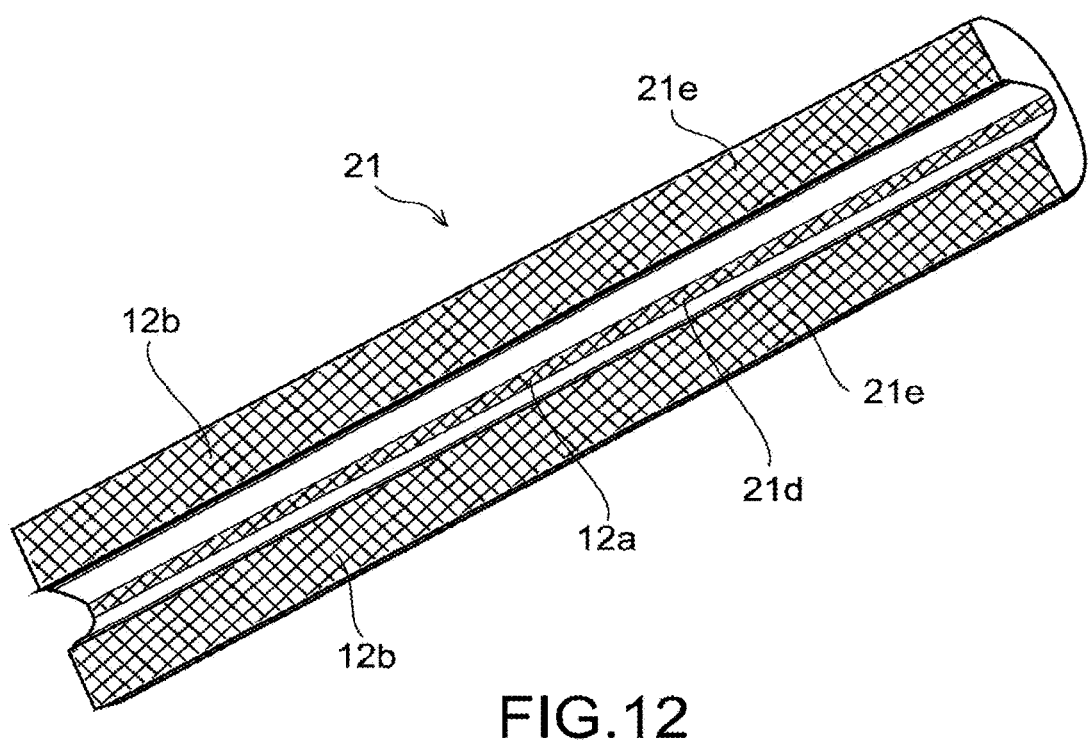
FIG. 12 is a diagram showing a modification of the lens shown in FIGS. 4 and 5.
Figure 13:
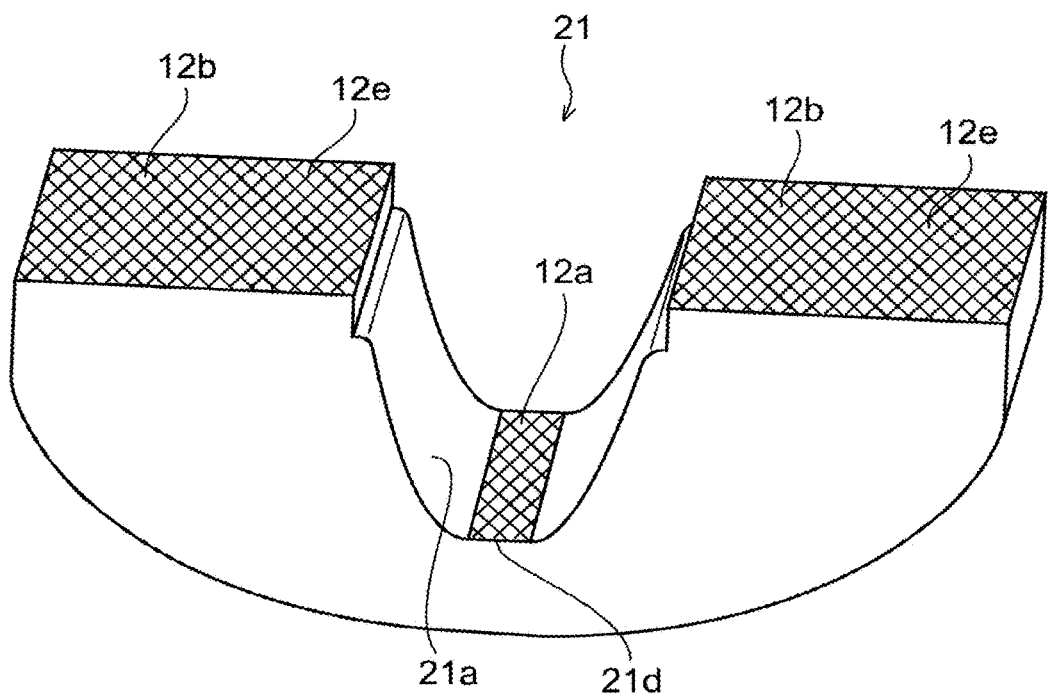
FIG. 13 is a partially-enlarged diagram of a bottom surface of the lens shown in FIG. 12.

As a modification of the lens 1, it is also possible to provide a print processing portion 12b that has been subjected to the print processing on a bottom surface 21e of a lens 21 as shown in FIG. 12. FIG. 13 is a partially-enlarged diagram of the bottom surface 21e of the lens 21 shown in FIG. 12. The lens 21 is different from the lens 1 in that the print processing portion is provided on the bottom surface 21e of the lens 21.

The print processing portion 12b only needs to include, mainly, a function of scattering or reflecting the light advancing toward the bottom surface 21e out of the light that has passed through the light guide portion 1b. Therefore, light transmission of the print processing portion 12b and that of a print processing portion 12a at a plane portion 21d may be different, or may be the same. It is also possible to set the light transmission of the print processing portion 12b on the bottom surface 21e to be smaller than that of the print processing portion 12a at the plane portion 21d.

Alternatively, a reflective member or a reflective film as a member other than the member subjected to the print processing may be formed on the bottom surfaces 1e and 21e of the lenses 1 and 21, respectively. For example, a reflective film formed of metal such as aluminum may be formed on the bottom surfaces 1e and 21e.

Figure 14:
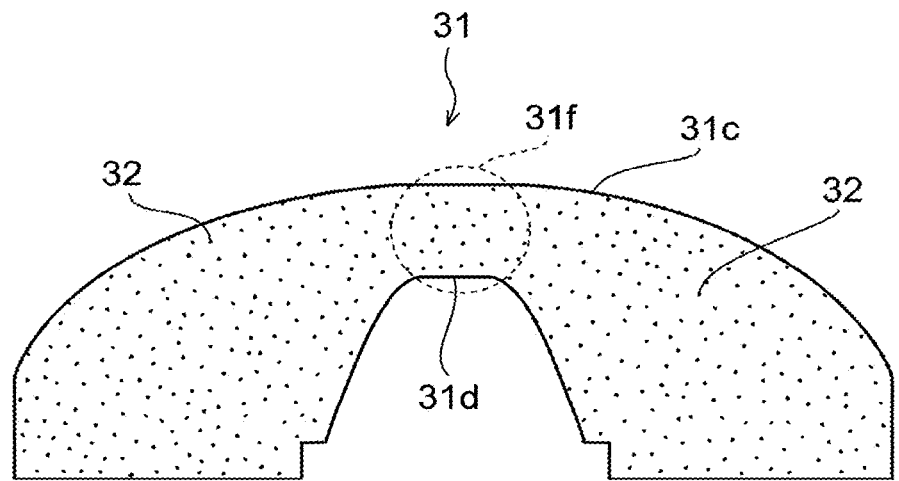
FIG. 14 is a cross-sectional diagram showing a lens according to another embodiment of the present invention.

FIG. 14 is a cross-sectional diagram showing a lens according to another embodiment of the present invention. In descriptions below, descriptions on structures, functions, and the like similar to those of the light source unit 5 and the lens 1 of the embodiment shown in FIGS. 1 to 5 etc. will be simplified or omitted, and points different therefrom will mainly be described.

As in the case of FIG. 4, FIG. 14 is a cross-sectional diagram seen from the x-axis direction. A lens 31 of this embodiment contains a diffusing material 32. Due to the diffusing material 32 of the lens 31, light can be efficiently diffused to thus suppress luminance variability and color variability. Particularly an effect of uniformizing and obscuring light that passes a center portion 31f of the lens 31, that is, a part between a plane portion 31d and a part of a light-emitting surface 31c opposed to the plane portion 31d can be obtained.

The diffusing material 32 does not necessarily have to be contained in the entire lens 31, but only needs to be contained in at least the center portion 31f of the lens 31.

The following materials can be exemplified as the diffusing material 32.

Examples include cross-linked acrylic powder, acrylic ultrafine powder, cross-linked polystyrene particles, methyl silicone powder, cross-linked styrene particles, monodispersed cross-linked acrylic particles, cross-linked siloxane series, silver powder, titanium oxide, calcium carbonate, barium sulfate, aluminum hydroxide, silica, glass, white carbon, talc, mica, magnesium oxide, and zinc oxide.

Figure 15:
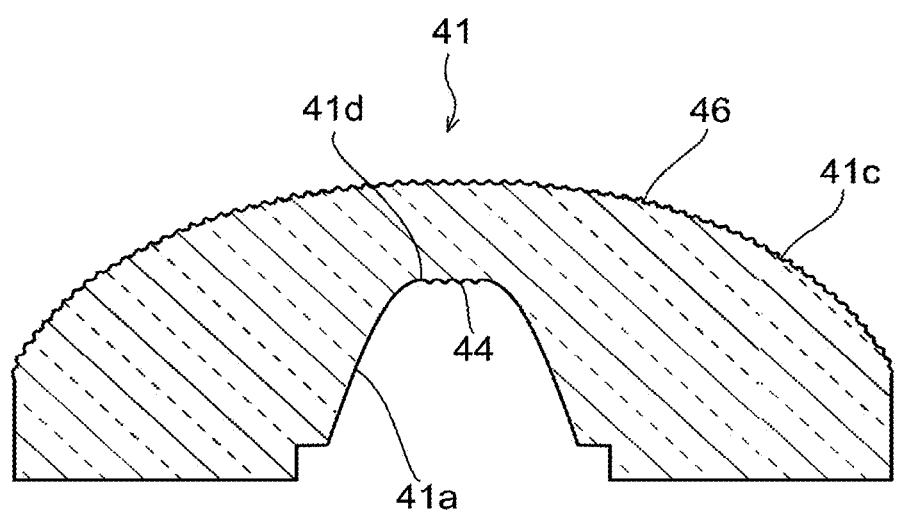
FIG. 15 is a cross-sectional diagram showing a lens according to still another embodiment of the present invention.

FIG. 15 is a cross-sectional diagram showing a lens according to still another embodiment of the present invention. A roughening processing portion 44 that has been subjected to roughening processing is provided at a center portion (plane portion 41d) on a light-incident surface 41a of a lens 41. Further, a roughening processing portion 46 similar to the roughening processing portion 44 is provided on a light-emitting surface 41c of the lens 41. The roughening processing portions 44 and 46 may be prism-like parts, or may be parts subjected to dot processing or blast processing. The roughening processing portions 44 and 46 may alternatively be formed by processing different from each other (prism, dot, blast, etc.).

Figure 16:
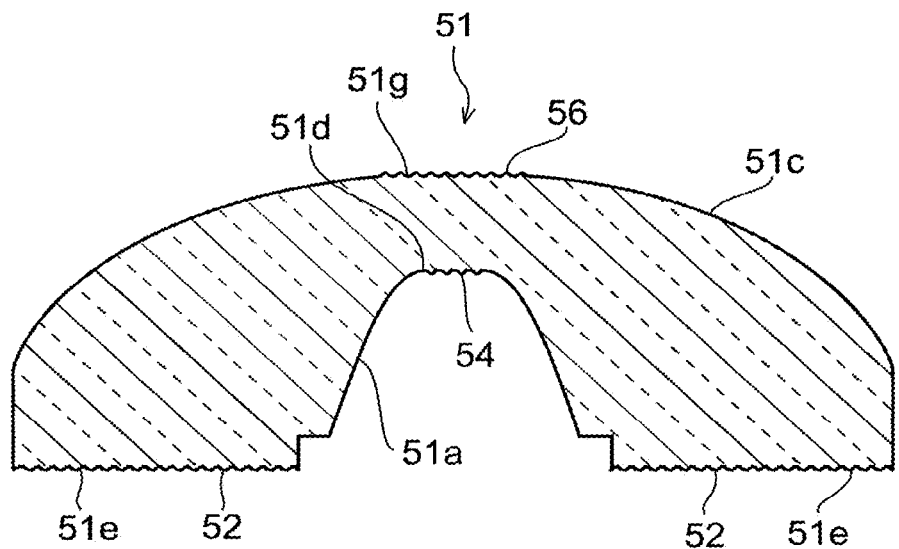
FIG. 16 is a cross-sectional diagram showing a lens according to still another embodiment of the present invention.

FIG. 16 is a cross-sectional diagram showing a lens according to still another embodiment of the present invention. Roughening processing portions 54, 56, and 52 are respectively provided at a center portion (plane portion 51d) of a light-incident surface 51a of a lens 51, a part 51g of a light-emitting surface 51c opposed to the plane portion 51d, and a bottom surface 51e. The roughening processing portions 54, 56, and 52 are the same as that described in the embodiment shown in FIG. 15.

Figure 17:
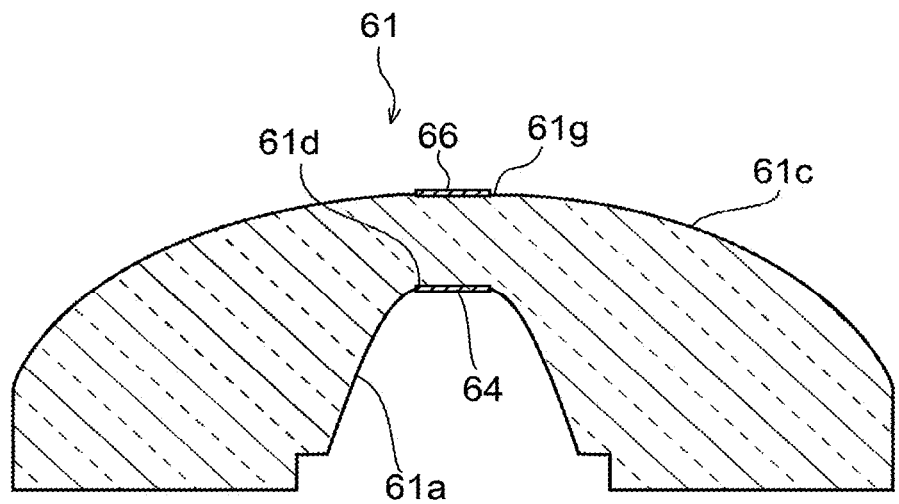
FIG. 17 is a cross-sectional diagram showing a lens according to still another embodiment of the present invention.

FIG. 17 is a cross-sectional diagram showing a lens according to still another embodiment of the present invention. Print processing portions 64 and 66 are respectively provided at a center portion (plane portion 61d) of a light-incident surface 61*a* of a lens 61 and a part 61*g* of a light-emitting surface 61*c* opposed to the plane portion 61*d*. The print processing portions 64 and 66 are the same as the print processing portion 12 of the embodiment shown in FIGS. 1 to 5.

Figure 18:
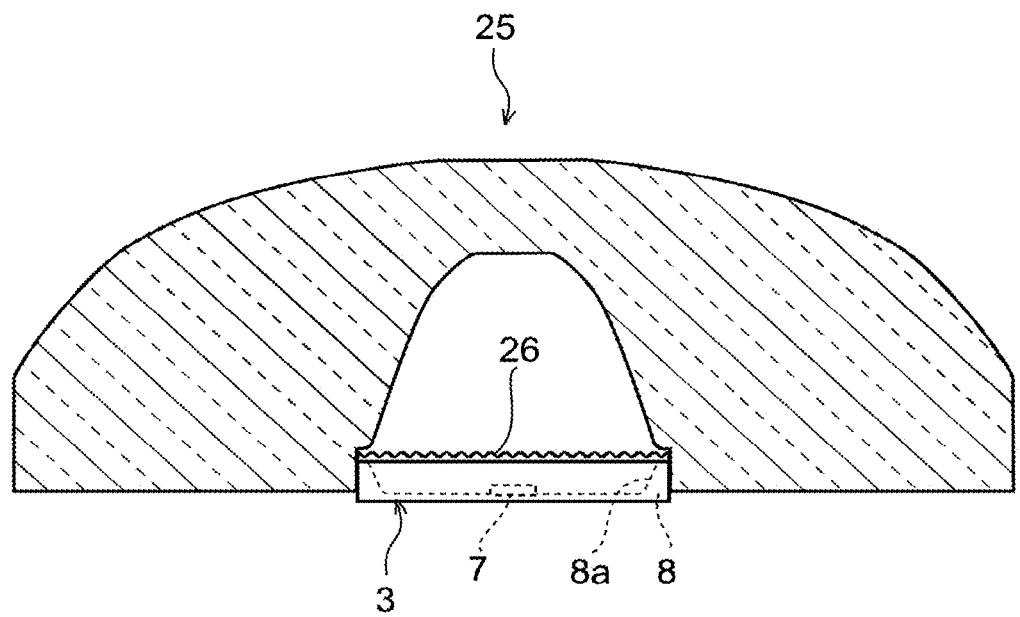
FIG. 18 is a cross-sectional diagram showing a light source unit according to still another embodiment of the present invention.

FIG. 18 is a cross-sectional diagram showing a light source unit according to still another embodiment of the present invention. An optical member 26 for scattering or diffusing light from the LED blocks 3 is mounted on the LED blocks 3 of a light source unit 25. A surface of the optical member 26 (surface from which light from the LEDs 7 is emitted) is subjected to, for example, the roughening processing described above such as the prism processing, dot processing, and blast processing.

The optical member 26 may be used as, for example, a sealing member for sealing up the LEDs 7 (e.g., member for sealing the concave portion 8*a* of the reflector 8). Accordingly, because the sealing member also functions to scatter or diffuse the light from the LEDs 7, luminance variability and color variability can be suppressed while contributing to a reduction in thickness of the light source unit 25. By using the optical member 26 subjected to the prism processing, for example, it is possible to prevent light of a certain color out of RGB and/or other colors from advancing in the vertical or near-vertical direction. Thus, light distribution characteristics can be enhanced.

Examples of the material for the optical member 26 include a transparent silicone resin, an olefin-based resin, other resins, and glass. It is also possible for the optical member 26 to contain various diffusing materials described above.

In addition, a surface of the reflector 8 (e.g., surface of the concave portion 8*a*) of the LED blocks 3 may be subjected to the roughening processing.

Figure 19:
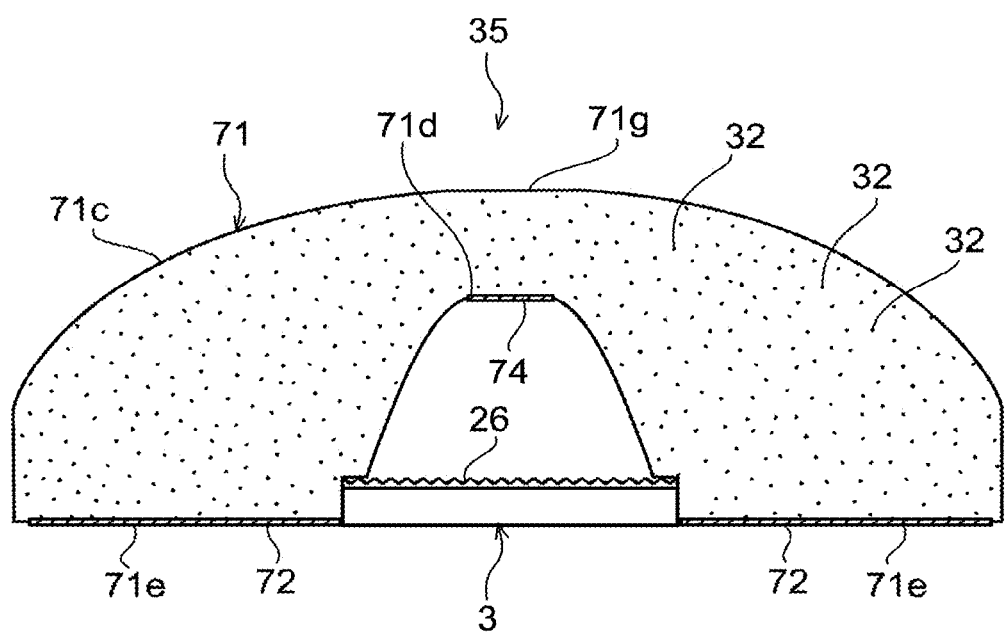
FIG. 19 is a cross-sectional diagram showing a light source unit according to still another embodiment of the present invention.

It is also possible to realize a lens constituted by combining at least two feature parts of the lenses 1, 21, 31, 41, 51, and 61 and the light source unit 25 shown in FIG. 1 (and FIGS. 2 to 5) and 12 to 18. FIG. 19 is a cross-sectional diagram showing a light source unit according to one of the embodiments on the combinations, for example. In a light source unit 35, a plane portion 71*d* and a bottom surface portion 71*e* of a lens 71 are respectively provided with print processing portions 74 and 72. Moreover, the lens 71 contains the diffusing material 32, and the optical member 26 (e.g., prism sheet) is mounted on the LED block 3.

A part 71*g* of a light-emitting surface 71*c* of the lens 71 opposed to the plane portion 71*d* may be formed as a plane.

Figure 20:
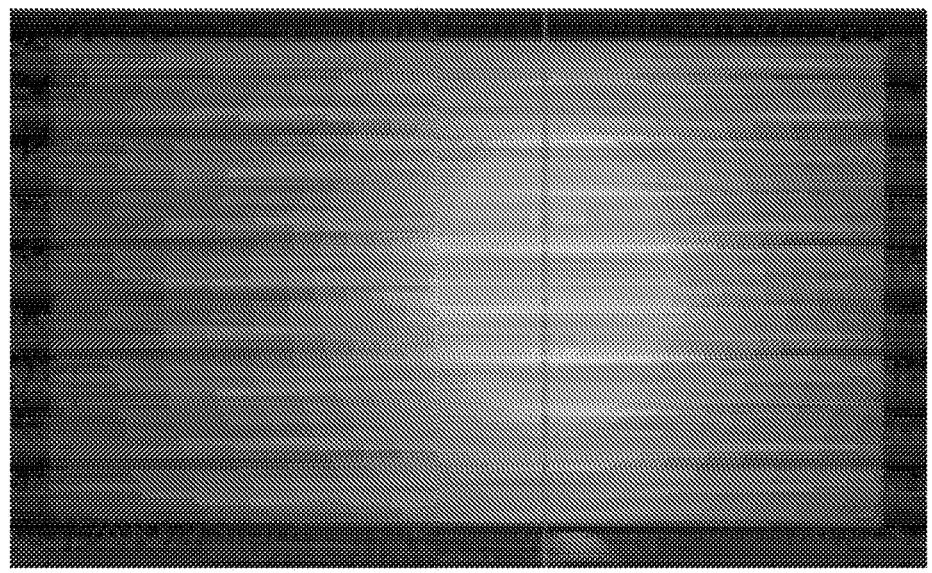
FIG. 20 is a photograph showing a state where light emitted from a single light source unit shown in FIG. 19 is diffused by a diffusing plate.

FIG. 20 is a photograph showing a state where light emitted from a single light source unit 35 shown in FIG. 19, in which 6 LED blocks 3 are provided, is diffused by a diffusing plate. In this example, an FWHM of 95 mm was obtained with respect to the TF on the diffusing plate. The inventors of the present invention have conducted a similar experiment on a light source unit without the lens, which resulted in an FWHM of 42 mm.

Figure 21:
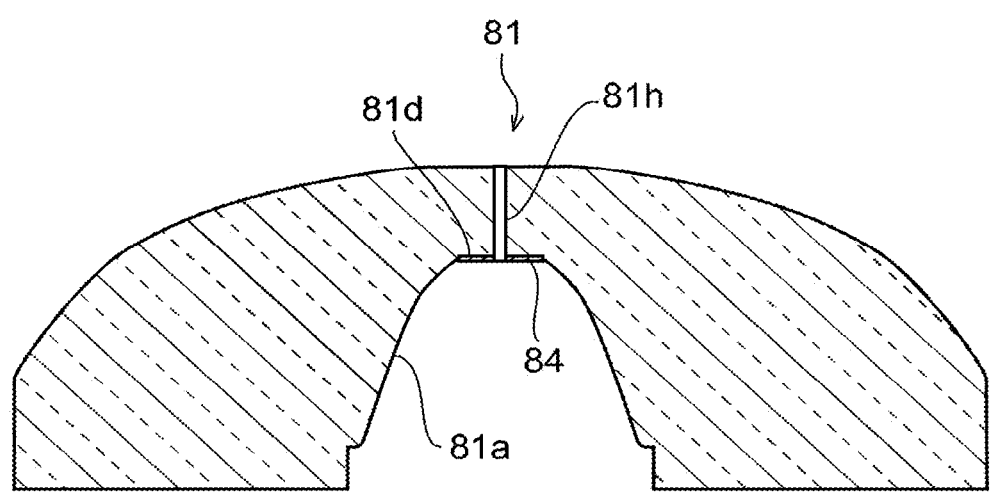
FIG. 21 is a cross-sectional diagram showing a lens according to still another embodiment of the present invention.

FIG. 21 is a cross-sectional diagram showing a lens according to still another embodiment of the present invention. At a center portion of a lens 81, a heat flow path 81*h* that is formed from a light-incident surface 81*a* to a light-emitting surface 81*c* and discharges heat radiated from the LED blocks 3 is provided. Accordingly, heat radiated from the LED blocks 3 can be discharged to the outside of the lens.

Typically, the heat flow path 81*h* is a through-hole penetrating the lens 81. However, it is also possible for the heat flow path 81*h* to be formed of a material having higher heat conductivity than a principle material of the lens 81, such as metal and carbon. The number, size, shape, location, and the like of the heat flow path 81*h* can be changed as appropriate.

It should be noted that the lens 81 shown in FIG. 21 is a lens provided with a print processing portion 84 at a plane portion 81*d* thereof. However, the heat flow path 81*h* may also be provided in the lenses 21, 31, 41, 51, 61, and 71 shown in the above embodiments.

FIGS. 22A to 22D are diagrams each showing an LED block according to another embodiment of the present invention.

Figure 22A:
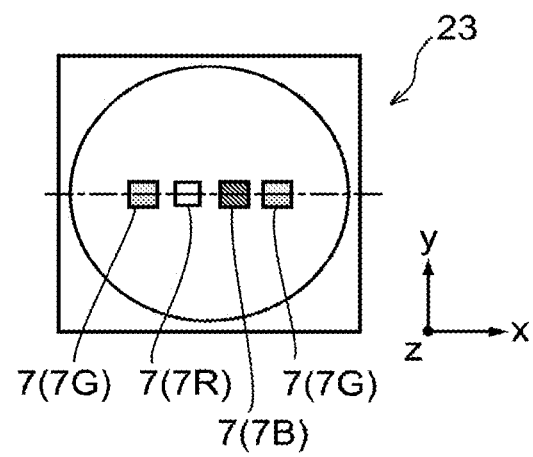
FIG. 22A is a diagram showing an LED block according to another embodiment that includes two green LEDs, a red LED, and a blue LED.

An LED block 23 shown in FIG. 22A includes an LED 7R, two LEDs 7G, and an LED 7B. Of the four LEDs 7, the two LEDs 7G disposed on both ends, for example, emit green light. A light source unit including the LED block 23 above typically includes a plurality of LED blocks 23 arranged in a direction in which the LEDs 7 are arranged (x-axis direction), and is also elongated in the x-axis direction.

Figure 22B:
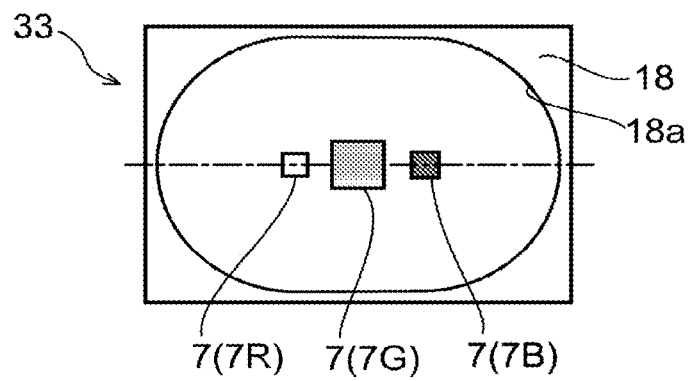
FIG. 22B is a diagram showing an LED block according to another embodiment that includes a red LED, a blue LED, and a green LED with a larger light-emitting area than the other LEDs.

Of the three LEDs 7 in an LED block 33 shown in FIG. 22B, the LED 7G in the middle is the largest. In other words, the LED 7G has a larger light-emitting area than other LEDs 7. Though a concave portion 18*a* of a reflector 18 has an oval shape, the shape may of course be a circle.

Figure 22C:
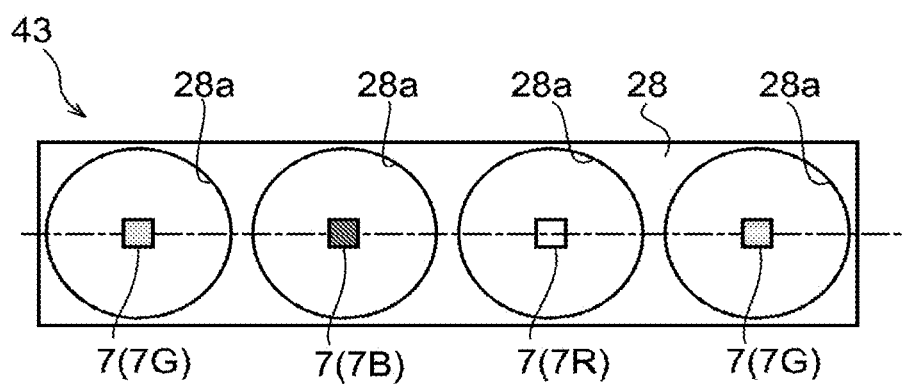
FIG. 22C is a diagram showing an LED block according to another embodiment that includes a concave portion of a reflector for each of four LEDs.

In an LED block 43 shown in FIG. 22C, a concave portion 28*a* of a reflector 28 is provided to each of the four LEDs 7. Of the four LEDs 7, the LEDs 7G on both ends, for example, emit green light.

Figure 22D:
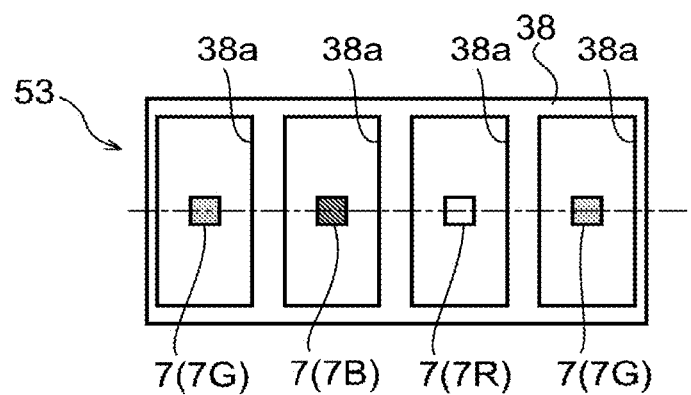
FIG. 22D is a diagram showing an LED block according to another embodiment that includes a reflector having quadrangular concave portions.

An LED block 53 shown in FIG. 22D includes a reflector 38 having quadrangular (e.g., rectangular or quadrate) concave portions 38*a*.

For the lenses of the light source units mounted with the LED blocks 23, 33, 43, and 53 shown in FIGS. 22A to 22D, respectively, it is only necessary to employ the lens 1, 21, 31, 41, 51, 61, 71, or 81 of the above embodiments, or a lens as a combination of at least two feature parts of those lenses.

Figure 23:
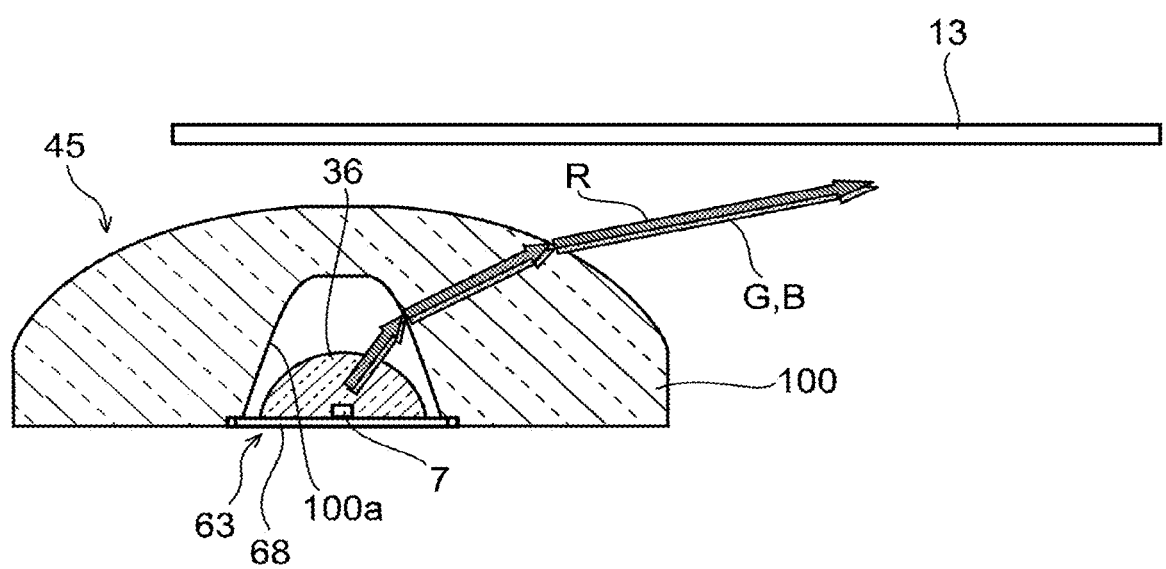
FIG. 23 is a cross-sectional diagram showing a light source unit according to still another embodiment of the present invention.

FIG. 23 is a cross-sectional diagram showing a light source unit according to still another embodiment of the present invention.

Figure 24A:
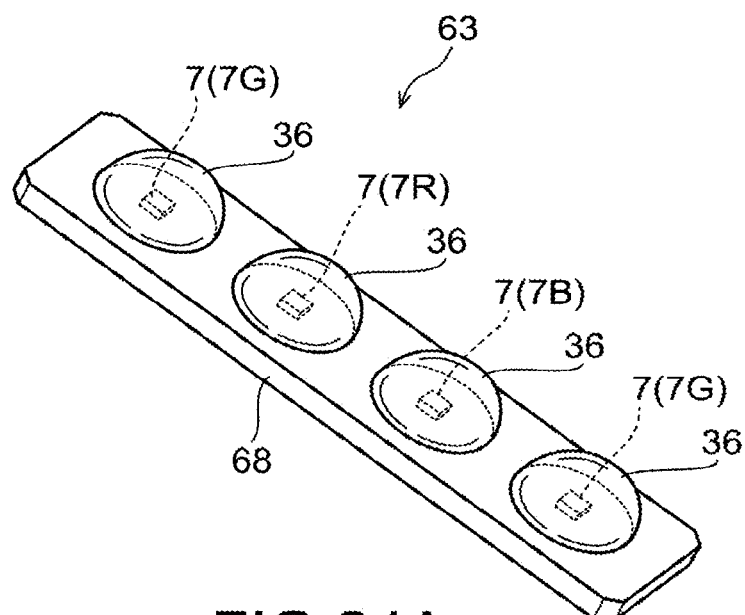
FIG. 24A is a perspective diagram showing the LED block.
Figure 24B:
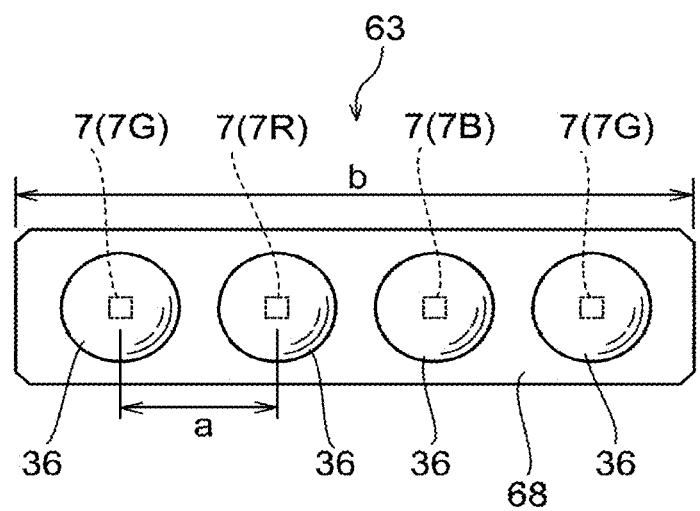
FIG. 24B is a plan view of the LED block in FIG. 24A.

An LED block 63 of a light source unit 45 is a potting-type LED block. FIG. 24A is a perspective diagram showing the LED block 63, and FIG. 24B is a plan view thereof. The potting-type LED block 63 has a structure in which each of the plurality of LEDs 7 arranged in a row on a common substrate 68 is sealed up.

A sealing member 36 is constituted of a transparent resin, glass, or the like, and has a shape of, for example, a partial sphere, that is, the sealing member 36 has a function of a lens. The partial sphere is typically a hemisphere, but is not limited thereto. Further, instead of a sphere, a toroidal surface or a multi-order curved surface of a quadratic surface or more may also be employed. The sealing member 36 may be formed of the same material as the optical member 26, or may be formed of a different material. As the LEDs 7, typically, the LEDs 7G are disposed on both ends and the two LEDs 7R and 7B are disposed in the middle. The coloration, arrangement, number, and the like of the LEDs 7 can be changed as appropriate.

Figure 25:
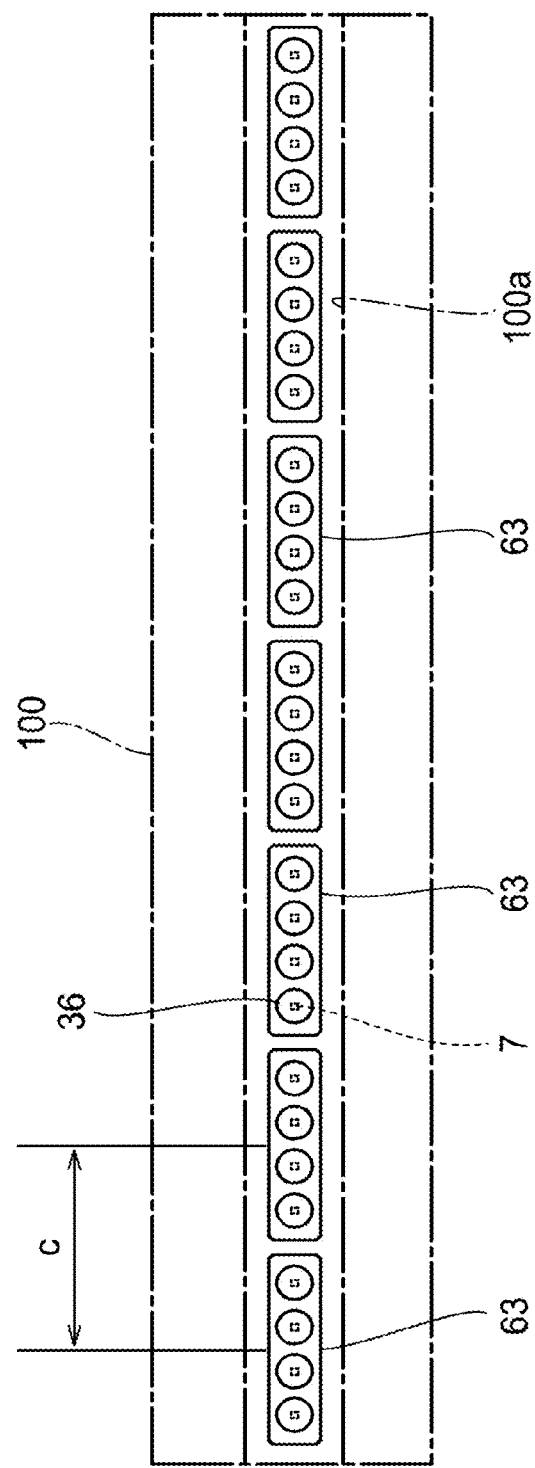
FIG. 25 is a plan view of a light source unit showing a state where a plurality of LED blocks are arranged inside a light-incident surface of a lens.

FIG. 25 is a plan view showing a state where the plurality of thus-structured LED blocks 63 are arranged inside a light-incident surface 100*a* of a lens 100. As shown in FIG. 25, a single light source unit 45 typically includes the plurality of LED blocks 63 and one lens 100. The number of LED blocks 63 to be contained in a single light source unit 45 can be changed as appropriate.

For the lens 100, it is only necessary to employ the lens 1, 21, 31, 41, 51, 61, 71, or 81 of the above embodiments, or a lens as a combination of at least two feature parts of those lenses.

Sizes a, b, and c shown in FIGS. 24B and 25 are 2 to 4 mm, 9 to 12 mm, and 9 to 15 mm, respectively, though not limited thereto.

Figure 26:
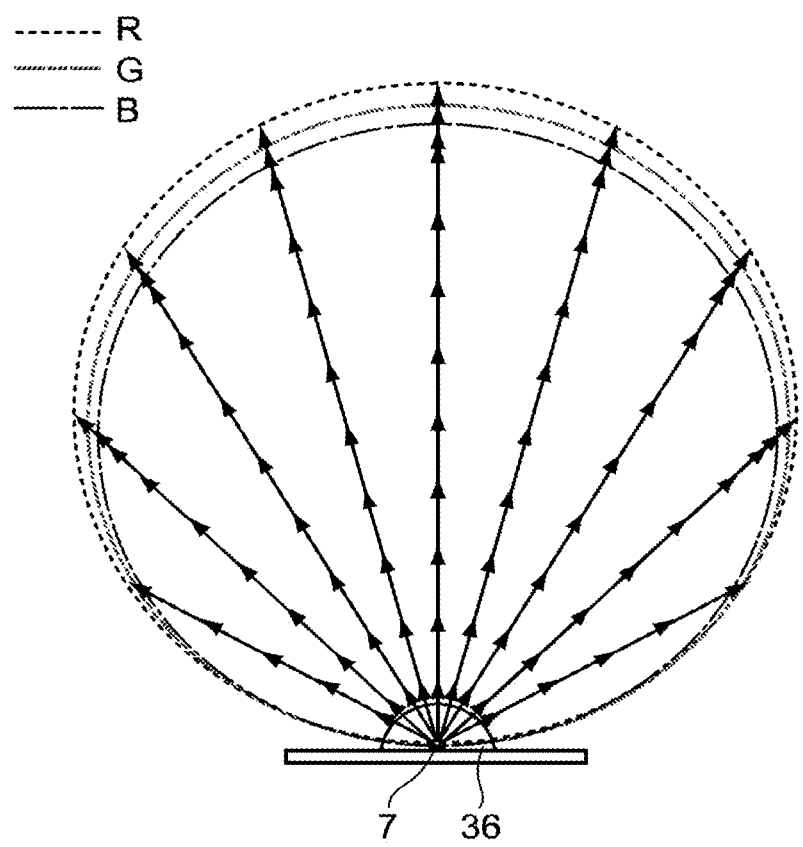
FIG. 26 is a diagram showing RGB light distribution characteristics of the LED block.

By using such potting-type LED blocks 63, distributions of red (R) light, green (G) light, and blue (B) light become substantially the same as shown in FIG. 23, for example, and mixing of colors with respect to the diffusing plate is facilitated. Accordingly, color variability is suppressed. FIG. 26 is a diagram showing RGB light distribution characteristics of the LED block 63. As shown in FIG. 26, RGB light distribution close to Lambertian (uniform diffusion) is realized.

In particular, because the sealing member 36 of the LED block 63 is formed as a partial sphere, a multiple reflection caused by a total reflection is suppressed, whereby a high light extraction efficiency can be realized. Further, because the sealing member 36 is formed as the partial sphere, a single LED becomes close to a linear light source at a macro level, whereby it becomes possible to fully exhibit the function of a lens.

Figure 27A:
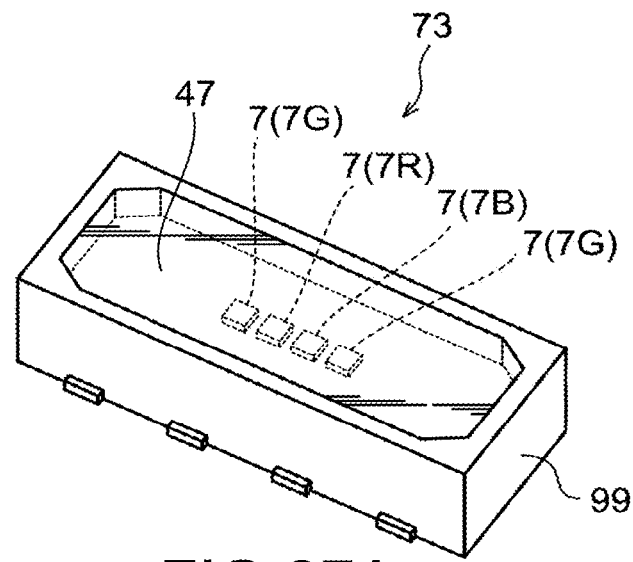
FIG. 27A is a perspective diagram showing an LED block according to still another embodiment of the present invention.
Figure 27B:
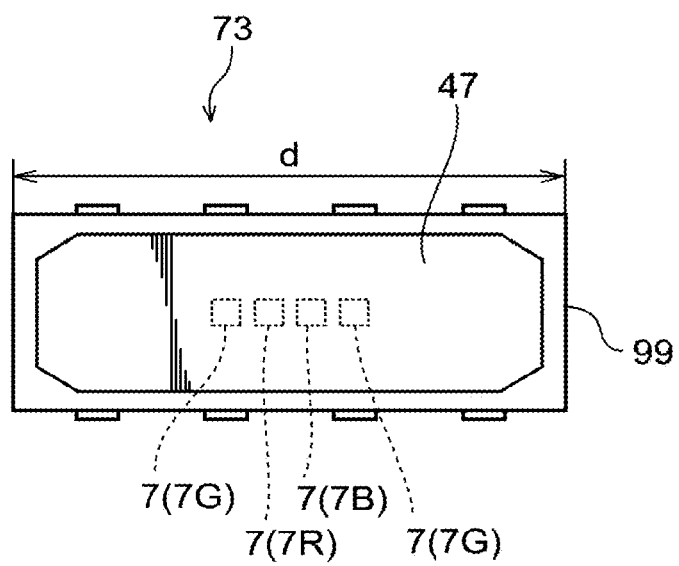
FIG. 27B is a plan view of the LED block in FIG. 27A.

FIG. 27A is a perspective diagram showing an LED block according to still another embodiment of the present invention, and FIG. 27B is a plan view thereof.

An LED block 73 includes a plurality of LEDs 7 arranged close to each other, a case 99 for packaging the LEDs 7, and a sealing member 47 for sealing up the LEDs 7. In FIGS. 27A and 27B, the LEDs 7G, 7R, 7B, and 7G are arranged in the stated order from the left-hand side. The coloration, arrangement, number, and the like of the LEDs 7 can be changed as appropriate. The sealing member 47 is constituted of a transparent resin, glass, or the like, and an upper surface thereof is a plane without the function of a lens. However, it is also possible to design the sealing member 47 in a shape that provides the function of a lens.

As shown in FIG. 27B, a size d of the case 99 in the lateral direction is 6 to 9 mm, though not limited thereto.

Figure 28:
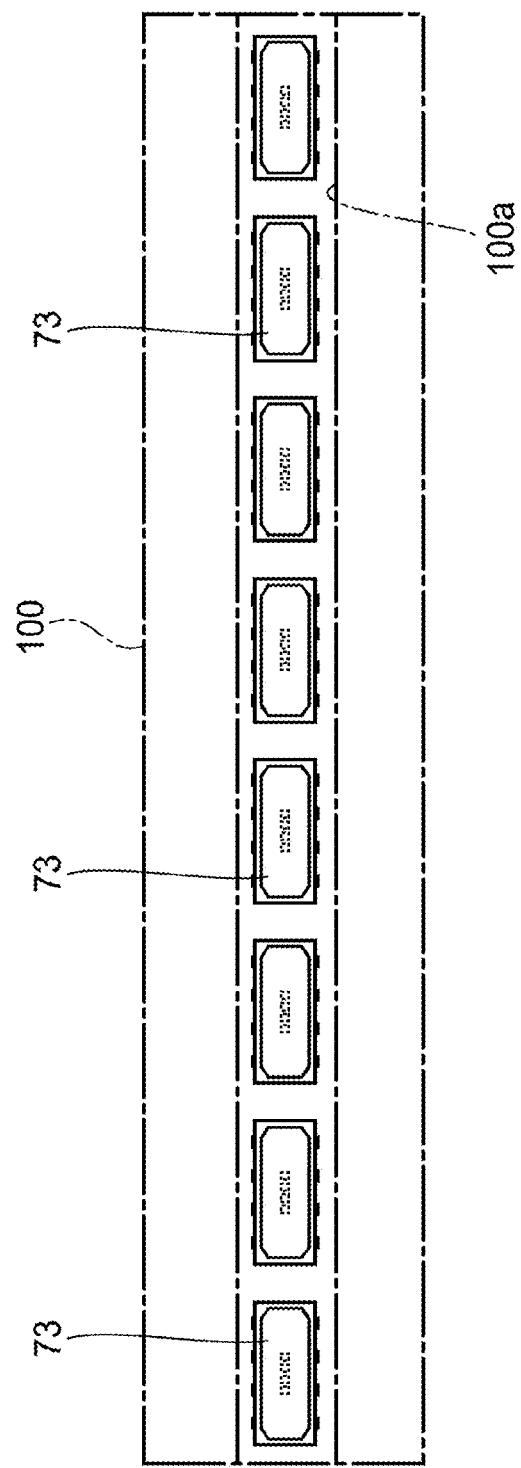
FIG. 28 is a plan view of a light source unit showing a state where the LED block shown in FIG. 27 is arranged plurally inside a light-incident surface of a lens.

FIG. 28 is a plan view of a light source unit showing a state where the plurality of LED blocks 73 are arranged inside the light-incident surface 100a of the lens 100, as in the case of the light source unit shown in FIG. 25.

Figure 29:
FIG. 29 is a table showing a result of comparison between the LED block shown in FIG. 24 and the LED block shown in FIG. 27.

It should be noted that FIG. 29 is a table showing a result of comparison between the LED block 63 shown in FIG. 24 and the LED block 73 shown in FIG. 27.

An embodiment of the present invention is not limited to the above embodiments, and various other embodiments may also be employed.

The above descriptions have been given on the case where the light source unit or the backlight apparatus 10 of the above embodiments is applied to a display apparatus. However, the present invention is not limited to the display apparatus, and the light source unit and the backlight apparatus 10 can also be applied to billboards for commercial use and billboards for advertisements.

As shown in FIGS. 1 and 2, in the above embodiments, each of the LED blocks 3, 23, 33, 43, and 53 has been mounted on the base member 4, and the base member 4 has been attached to the supporting member 2. However, it is also possible for the LED blocks 3, 23, 33, 43, and 53 (or LEDs 7) to be attached directly to the supporting member 2.

In FIGS. 22A to 22D, the examples in which the LED blocks 23, 33, 43, and 53 are each mounted with the LEDs 7 that respectively emit red light, green light, and blue light have been described. However, the LED blocks 23, 33, 43, and 53 that are each mounted with a white-color LED are also applicable.

It should be understood by those skilled in the art that various modifications, combinations, sub-combinations and alterations may occur depending on design requirements and other factors insofar as they are within the scope of the appended claims or the equivalents thereof.

What is claimed is:

1. A lens configured to diffuse light emitted from a light source, the lens comprising:
   a concave light-incident surface including a plane portion opposed to the light source and an optical function portion that is formed on the plane portion and scatters the light, wherein at least a portion of the light emitted from the light source enters the light-incident surface;
   a light guide portion through which the light that has entered the light-incident surface passes;
   a light-emitting surface configured to emit the light that passes through the light guide portion, and
   a bottom surface including a print processing portion, a roughening processing portion, or a reflective film portion, wherein
   the light source comprises a plurality of light-emitting elements that are arranged in a predetermined direction,
   the lens is elongated in the predetermined direction, and
   the print processing portion, the roughening processing portion, or the reflective film portion of the bottom surface contacts a side surface of a substrate of the light source along the predetermined direction, the side surface being parallel to a shortest line between the plane portion and the light source.

2. The lens according to claim 1, wherein the optical function portion is a part that has been subjected to print processing.

3. The lens according to claim 2, wherein the light-emitting surface includes a part opposed to the plane portion that has been subjected to the print processing.

4. The lens according to claim 1, wherein the optical function portion is a part that has been subjected to roughening processing.

5. The lens according to claim 4, wherein the light-emitting surface includes a part opposed to the plane portion that has been subjected to the roughening processing.

6. The lens according to claim 1, wherein the light-emitting surface includes a part opposed to the plane portion that has been subjected to roughening processing.

7. The lens according to claim 1, wherein the light guide portion comprises a diffusing material for diffusing the light.

8. The lens according to claim 1, further comprising a heat flow path that is formed from the light-incident surface to the light-emitting surface and discharges heat radiated from the light source.

9. The lens according to claim 1, wherein the plurality of light-emitting elements emit light by an EL (Electro Luminescence) phenomenon.

10. The lens according to claim 9, wherein the lens has light distribution characteristics that are substantially the same in a direction orthogonal to the predetermined direction within a plane on which the plurality of light-emitting elements are arranged.

11. A light source unit, comprising:
   a light source; and
   a lens configured to diffuse light emitted from the light source, the lens comprising:
      a concave light-incident surface including a plane portion opposed to the light source and an optical function portion that is formed on the plane portion and scatters the light, wherein at least a portion of the light emitted from the light source enters the light-incident surface, a light guide portion through which the light that has entered the light-incident surface passes, a light-emitting surface configured to emit the light that passes through the light guide portion, and a bottom surface including a print processing portion, a roughening processing portion, or a reflective film portion, wherein the light source comprises a plurality of light-emitting elements that are arranged in a predetermined direction, the lens is elongated in the predetermined direction, and the print processing portion, the roughening processing portion, or the reflective film portion of the bottom surface contacts a side surface of a substrate of the light source along the predetermined direction, the side surface being parallel to a shortest line between the plane portion and the light source.

12. The light source unit according to claim 11, further comprising:
an optical member that is mounted on the light source and scatters the light.

13. The light source unit according to claim 12, wherein the light-emitting elements emit light by an EL (Electro Luminescence) phenomenon, and wherein the optical member includes a sealing member to seal the light-emitting elements.

14. The light source unit according to claim 13, wherein the optical member contains a diffusing material.

15. The light source unit according to claim 13, wherein the plurality of light-emitting elements arranged on the substrate of the light source, and wherein the sealing member seals each of the plurality of light-emitting elements.

16. The light source unit according to claim 13, wherein the shape of the sealing member is a hemisphere.

17. The light source unit according to claim 13, wherein at least a portion of the light emitted from the light source enters the sealing member, and
wherein the sealing member is configured to scatter the entered portion of the light into the light-incident surface.

18. A display apparatus, comprising:
a light source unit including a light source;
a lens to diffuse light emitted from the light source, the lens comprising:
    a concave light-incident surface including a plane portion opposed to the light source and an optical function portion that is formed on the plane portion and scatters the light, wherein at least a portion of the light emitted from the light source enters the light-incident surface,
    a light guide portion through which the light that has entered the light-incident surface passes,
    a light-emitting surface configured to emit the light that passes through the light guide portion, and
    a bottom surface including a print processing portion, a roughening processing portion, or a reflective film portion;
a supporting member to support the light source unit; and
a light transmission control panel that includes a plurality of pixels and controls transmission of the light emitted from the lens for each of the plurality of pixels, wherein
the light source comprises a plurality of light-emitting elements that are arranged in a predetermined direction,
the lens is elongated in the predetermined direction, and the print processing portion, the roughening processing portion, or the reflective film portion of the bottom surface contacts a side surface of a substrate of the light source along the predetermined direction, the side surface being parallel to a shortest line between the plane portion and the light source.

19. A backlight apparatus, comprising:
a light source unit comprising a light source;
a lens to diffuse light emitted from the light source, the lens comprising:
    a concave light-incident surface including a plane portion opposed to the light source and an optical function portion that is formed on the plane portion and scatters the light, wherein at least a portion of the light emitted from the light source enters the light-incident surface,
    a light guide portion through which the light that has entered the light-incident surface passes,
    a light-emitting surface configured to emit the light that passes through the light guide portion, and
    a bottom surface including a print processing portion, a roughening processing portion, or a reflective film portion, and
a supporting member to support the light source unit, wherein
the light source comprises a plurality of light-emitting elements that are arranged in a predetermined direction,
the lens is elongated in the predetermined direction, and
the print processing portion, the roughening processing portion, or the reflective film portion of the bottom surface contacts a side surface of a substrate of the light source along the predetermined direction, the side surface being parallel to a shortest line between the plane portion and the light source.

20. A display comprising: a light source having at least one of red, green, or blue diodes, the light source comprising a series of light emitting diode blocks, wherein each light emitting diode block includes and supports a light emitting diode that is one of the at least one of the red, green, or blue diodes: a sealing member sealing the at least one of the red, green, or blue diodes, the sealing member having a lens function: and lenses configured to diffuse light emitted from the light source, each lens comprising: a light-incident surface, wherein at least a portion of the light emitted from the light source enters the light-incident surface: a light guide portion through which the light that has entered the light-incident surface passes: a light-emitting surface configured to emit the light that passes through the light guide portion: a bottom surface: and a roughening processing portion disposed on a plane portion of the light-incident surface, wherein a shape of the light guide portion performs a lens function on light passing through the light guide portion such that the passing light is additionally diffused after diffusion by the roughening processing portion, wherein the lenses contact top surfaces of the light emitting diode blocks.

21. The display of claim 20, wherein the light source comprises a plurality of light-emitting elements that are arranged in a predetermined direction.

22. The display of claim 21, wherein the bottom surface comprises a second roughening processing portion or a reflective film portion, and the bottom surface contacts a side surface of a substrate of the light source along the predetermined direction.

23. The display of claim 21, wherein the optical function portion scatters light, and is disposed opposite to the light source.

24. The display of claim 20, wherein the light emitting diode blocks comprise at least one pitch that ranges from 9 to 15 mm.

25. The display of claim 20, wherein each light emitting diode block comprises a concave portion therein, each concave portion supports one of the light emitting diodes.

26. The display of claim 25, wherein the concave portions are reflectors.

27. The display of claim 26, wherein each concave portion comprises the sealing member therein that diffuses light from the light emitting diodes.

28. The display of claim 25, wherein each concave portion comprises the sealing member therein that diffuses light from the light emitting diodes.

29. The display of claim 27, wherein each lens fits over one of the light emitting diode blocks.

30. The display of claim 28, wherein each lens fits over one of the light emitting diode blocks.

31. The display of claim 20, wherein the light-emitting surface is smooth directly above the roughening processing portion.

32. A display comprising: at least one red, green, or blue light emitting diode; at least one light emitting diode block, having a concave profile and housing at least one light emitting diode within the concave profile; a sealing member, configured to seal the at least one red, green, or blue diode, the sealing member having a lens function and being configured to scatter or diffuse light, the sealing member mounted on the at least one light emitting diode block, the sealing member comprising a resin and containing a diffusing material and sealing the at least one light emitting diode: and at least one lens mounted on the at least one light emitting diode block, wherein the at least one lens contacts a top surface of the at least one light emitting diode block, wherein the at least one lens comprises a light-incident surface, wherein at least a portion of light emitted from the at least one light emitting diode enters the light-incident surface; a light guide portion through which the light that has entered the light-incident surface passes; a light-emitting surface configured to emit the light that passes through the light guide portion; a roughening processing portion disposed on a plane portion of the light-incident surface; and a bottom surface having a second roughening processing portion disposed thereon, wherein a shape of the light guide portion performs a lens function on light passing through the light guide portion such that the passing light is additionally diffused after diffusion by the second roughening processing portion.

33. The display of claim 32, wherein the at least one light emitting diode block houses more than one light emitting diode, and the light emitting diode blocks have at least one pitch that ranges from 9 to 15 mum.

34. The display of claim 32, wherein the at least one light emitting diode block houses four light emitting diodes.

35. A display comprising: a light source having at least one of red, green, or blue diodes, the light source comprises a series of light emitting diode blocks, wherein each light emitting diode block includes and supports the diodes, a sealing member on the light source that contacts and seals at least one of the red, green, or blue diodes and that has a top surface that has a lens function: and lenses configured to diffuse light emitted from the light source, each lens comprising: a light-incident surface, wherein at least a portion of the light emitted from the light source enters the light-incident surface; a light guide portion through which the light that has entered the light-incident surface passes; a light-emitting surface configured to emit the light that passes through the light guide portion; a roughening processing portion disposed on a plane portion of the light-incident surface: and a bottom surface that includes a second roughening processing portion disposed thereon, wherein the top surface of the sealing member is separated from the light-incident surface by an air gap, and wherein the lenses contact top surfaces of the light emitting diode blocks.

36. The display of claim 35, wherein each light emitting diode block comprises a concave portion therein, each concave portion supports one of the light emitting diodes.

37. The display of claim 36, wherein the concave portions are reflectors.

* * * * *